(12) United States Patent
Osetinsky

(10) Patent No.: US 9,195,747 B2
(45) Date of Patent: Nov. 24, 2015

(54) DATA ISOLATING RESEARCH TOOL

(75) Inventor: Bridget K Osetinsky, Philadelphia, PA (US)

(73) Assignee: Hyperfine, LLC, Philadephia, PA (US)

( * ) Notice: Subject to any disclaimer, the term of this patent is extended or adjusted under 35 U.S.C. 154(b) by 45 days.

(21) Appl. No.: 13/700,733

(22) PCT Filed: May 31, 2011

(86) PCT No.: PCT/US2011/038637
§ 371 (c)(1),
(2), (4) Date: Nov. 29, 2012

(87) PCT Pub. No.: WO2011/153171
PCT Pub. Date: Dec. 8, 2011

(65) Prior Publication Data
US 2013/0275404 A1    Oct. 17, 2013

Related U.S. Application Data

(60) Provisional application No. 61/350,089, filed on Jun. 1, 2010, provisional application No. 61/452,098, filed on Mar. 12, 2011.

(51) Int. Cl.
*G06F 17/30* (2006.01)
*G06Q 10/10* (2012.01)
*G06Q 40/08* (2012.01)

(52) U.S. Cl.
CPC .......... *G06F 17/30864* (2013.01); *G06Q 10/10* (2013.01); *G06Q 40/08* (2013.01)

(58) Field of Classification Search
None
See application file for complete search history.

(56) References Cited

U.S. PATENT DOCUMENTS

| | | | |
|---|---|---|---|
| 6,647,383 B1 * | 11/2003 | August et al. | 1/1 |
| 7,493,252 B1 * | 2/2009 | Nagano et al. | 704/9 |
| 2003/0009470 A1 * | 1/2003 | Leary | 707/100 |
| 2004/0030723 A1 * | 2/2004 | Gerstl et al. | 707/104.1 |
| 2004/0090472 A1 * | 5/2004 | Risch et al. | 345/853 |
| 2004/0161150 A1 | 8/2004 | Cukierman et al. | |
| 2005/0192946 A1 * | 9/2005 | Lu et al. | 707/3 |
| 2006/0116994 A1 * | 6/2006 | Jonker et al. | 707/3 |
| 2007/0038620 A1 | 2/2007 | Ka et al. | |
| 2007/0266015 A1 | 11/2007 | Shakib et al. | |
| 2008/0016046 A1 | 1/2008 | Guha | |
| 2008/0133479 A1 * | 6/2008 | Zelevinsky et al. | 707/3 |
| 2008/0168052 A1 * | 7/2008 | Ott et al. | 707/5 |
| 2009/0150387 A1 * | 6/2009 | Marchewitz | 707/5 |
| 2010/0017388 A1 * | 1/2010 | Glover | 707/5 |
| 2010/0076979 A1 * | 3/2010 | Wang et al. | 707/740 |
| 2011/0173264 A1 * | 7/2011 | Kelly | 709/205 |

OTHER PUBLICATIONS

"Horizontal Search Engine", Computer Desktop Encyclopedia, The Computer Language Company, retrieved on Oct. 24, 2014 from: http://lookup.computerlanguage.com/host_app/search?cid=C999999&def=686f72697a6f6e74616c20736561-72636820656e67696e65.htm.*

(Continued)

*Primary Examiner* — Alex Gofman
*Assistant Examiner* — Umar Mian
(74) *Attorney, Agent, or Firm* — Patent Capital Group

(57) ABSTRACT

The research tool is a series of vertical and horizontal engines where the vertical collects, isolates data and the horizontal clusters by metric. The tool uses a series of verticals and horizontals in a combination which allows for the isolation of causal factors by comparisonability.

20 Claims, 16 Drawing Sheets

(56) References Cited

OTHER PUBLICATIONS

"Vertical Search Engine", Computer Desktop Encyclopedia, The Computer Language Company, retrieved on Oct. 24, 2014 from: http://lookup.computerlanguage.com/host_app/search?cid=C999999&def=766572746963616c2073656172636820656e67696e65.htm.*

International Search Report, mailed Feb. 17, 2012 in connection with International Patent Application PCT/US2011/038637.

PCT International Preliminary Report on Patentability in PCT International Application Serial No. PCT/US2011/038637 mailed on Dec. 4, 2012 (33 pages).

\* cited by examiner

RIGHT: CONTINUES TO FIGURE 8D
BOTTOM: CONTINUES TO FIGURE 8B

TOP: CONTINUES TO

LEFT: CONTINUES TO

DATA ISOLATING RESEARCH TOOL

PRIORITY CLAIM(S) AND/OR CROSS REFERENCE(S) TO RELATED APPLICATION(S)

RELATED APPLICATIONS

This application is a national stage application under 35 U.S.C. §371 of PCT International Application Ser. No. PCT/US2011/038637, filed on May 31, 2011, and published as WO 2011/153171 A2 on Dec. 8, 2011. The PCT International Application claims priority to U.S. Provisional Application Serial No. 61/350,089, filed on Jun. 1, 2010, and U.S. Provisional Application Ser. No. 61/452,098, filed on Mar. 12, 2011. All of these referenced applications and publications are incorporated herein by reference and made a part hereof in their entirety, and the benefit of priority of which is claimed herein.

TECHNICAL FIELD

The invention is in the field of computer aided research and more specifically data manipulation and isolation and collaborating by an electronic device.

BACKGROUND ART

Computer aided research is a field currently dominated by piecewise methods of selecting data and exploiting. Such technologies include Mathematica, Lexisnexis, and Omniture. The current technology relies on predesigned pathways, connecting only connected data, where the discovery process of connecting is supposed to be done by researchers. The technologies comprising the components of the process and machine-tool are search engine technologies, used in a novel way to produce the unbefore cognized result of variable isolation. Current technologies include the vertical, horizontal, and diversity or cluster research engines, like those utilized by Google, Clusty, Expedia, Carrot2, and Pubmed. These do not function to aid in research by

SUMMARY OF INVENTION

Technical Problem

Modern research developed during the enlightenment with the invention of the scientific method. Since, science in every empirical industry, has been steadfastly using its method of normals and variables, testing hypothesis with tests, and basing conclusions on evidence. In the 20th century with the invention of the computer came a whole new way to collect and analyze data. The data collection and storage mechanism of computers has become so advanced that theories can be tested through programs of hypothetical systems and analysis. Data can almost literally be collected at infinitely small intervals and we are no longer at a lack of data that can be collected from numerous resources, in different formats and in varying intervals and stored without any problem. With the computer came the Internet and science 2.0, the concept of using science experiments from across groups in collaboration to solve new things via electronic sharing. But despite the advancement computers have afforded research, much of the data both collected by the massive computer stores, and that collected by the collaboration among users, remains largely useless because we do not possess the man-power to analyze it all. Today the crux, the time consuming part of research, is isolating data and isolating variables by hand. This has prolonged largely because of two unsolved problems: current tools lack the ability to automatically present data in the thickness of the context showing the strength a subset data element represents, and we cannot correlate data, collected from multiple sources, to automatically isolate variables and reach new conclusions on research problems. This manual element in the process makes data heavy problems too intensive to solve today.

The first need of a researching computer program, to see data in context, stems from the fact that data within context becomes more useful. Just like a financial analyst cannot make a decision about company's standings by looking at its today's stock price alone. He will have to consult the past and current financial statements of the company and would need to have sound understanding of the business sector to which the company belongs. Similarly a single data point in isolation (Website, point on a website, number) is only a fraction of the solution, and is almost useless in what it says about the group, because it just doesn't represent the same growing, shrinking, enormous importance, or miniatureness of the group, that research demands knowing and that the fact represents. For research to be informed the numbers a figure stands for need to be put together so the researcher can see and use these things in appropriate context.

The lack of a computer to electronically take data from multiple sources and isolate variables and research new conclusions, up to this point has been prohibited largely because no machine has been able to cross the variety of ways data is stored as prohibited because public and commercially available data (and sometimes even a researchers own data) is unorganized. In addition the unhomogenous nature of the data limits application of currently available analytical programs. This is a costly problem because it involves excessive manpower to collect data from different backgrounds and perform basic but intensive research. The manual process imposes limitations on the amount of data, the size of studies, and the number of variable isolating comparisons that can be studied. Due to limitations because of the resource intensive nature and human factor involvement, many cases leave us with no decisive end result.

This invention aims to solve these limitations of manpower effort involved in research and addresses the inability to use large data by placing data into its context and using that context and correlation among the data to solve new problems with the aid of electronic scientific method.

Solution to Problem

The tool works through two search engines creating a framework that will aid so the user selects data for a study, and selects the mechanisms of measurement he wants to compare the study by. The first search engine is deep and topical, a generic engine, being used to collect relevant data. Then a second operation, a clustering search operation is applied on the collected data to divide the data into categories of answers to the observed measurement of variables which can be used to measure elemental-answers' quality and the variables' complete dimensions. The diversity in the measurement caused by the horizontal engine creates a tool allowing for the preservation of other variables. The results of the horizontal engine create the tool by which comparisons can be made by when generic and diversity or vertical and horizontal research engines are used in some combination of multiples with other generic and diversity research engines which allows for research to proceed. The deep and topical create the normals and variables, out of collecting data into control data or variable data. The cluster operation chooses the measurement they are compared by. As described before, a normal and a variable in comparison allow research to proceed because the comparison between them allows causation isolation and much more. Commonalities between two different pools against the same measurement may represent a number of possibilities including indication of fundamental commonalities between both of them or that it takes both causes to create the observed result. The tool is composed of a series of vertical and horizontal search engines that jointly allow a user to choose the data and the metric to view and compare the collected data by. The joint operation of the research engines together can help the user choose the metric by which to view the topic by, giving the ability to compare previously unconnected things by comparing by the researcher's same metrics, comparison which allows isolation of causes and demonstration of differences and connections. The researcher will choose the path to isolate the variable of choice as well as take results and put it within a specific field of understanding to give it meaning, but, just as planting the same seed in different soils tells you something about the seed, the research tool's use of metrics to measure the differences in the pools of answers, tells researchers the information they want to know about the research by taking them through a discovery process of narrowing variables and allowing identification. The tool helps the user electronically run the test through the data to see if there is support to a hypothesis or even unknown result by going through the data, to manipulate in simultaneity many variables, utilizing mass data, and putting data molded and measured next to each other, in a way holding open more unknown variables and more data than can ever be managed manually, so you can see automatically if there are reasons for an inference.

A properly designed schedule of generic and diversity operations in combination allows for the most difficult research to be empirically studied by data. In its power it will propagate more solutions, and enable researchers to conduct mass studies, quickly. We are hoping it will impact history in a way that causes a knowledge revolution.

Advantageous Effects of Invention

The professional Data Isolating Research Tool will aid in researching solutions to—important questions. The Data Isolating creates the normals and variables of research by allowing researchers to create different pools and compare and contrast among them when using measurement matrix isolation. This allows the researcher to isolate causes and discover the connections between the results. Such an electronic tool allows research to go through more data, to isolate smaller variables, allows more comparisons, and is more efficient in terms of rate reaching solutions and preponderance for success than we can accomplish today because of the manual process.

BRIEF DESCRIPTION OF THE DRAWINGS

The drawings demonstrate how the use can produce isolation of causation.

DESCRIPTION OF THE EMBODIMENTS

Figure 1:
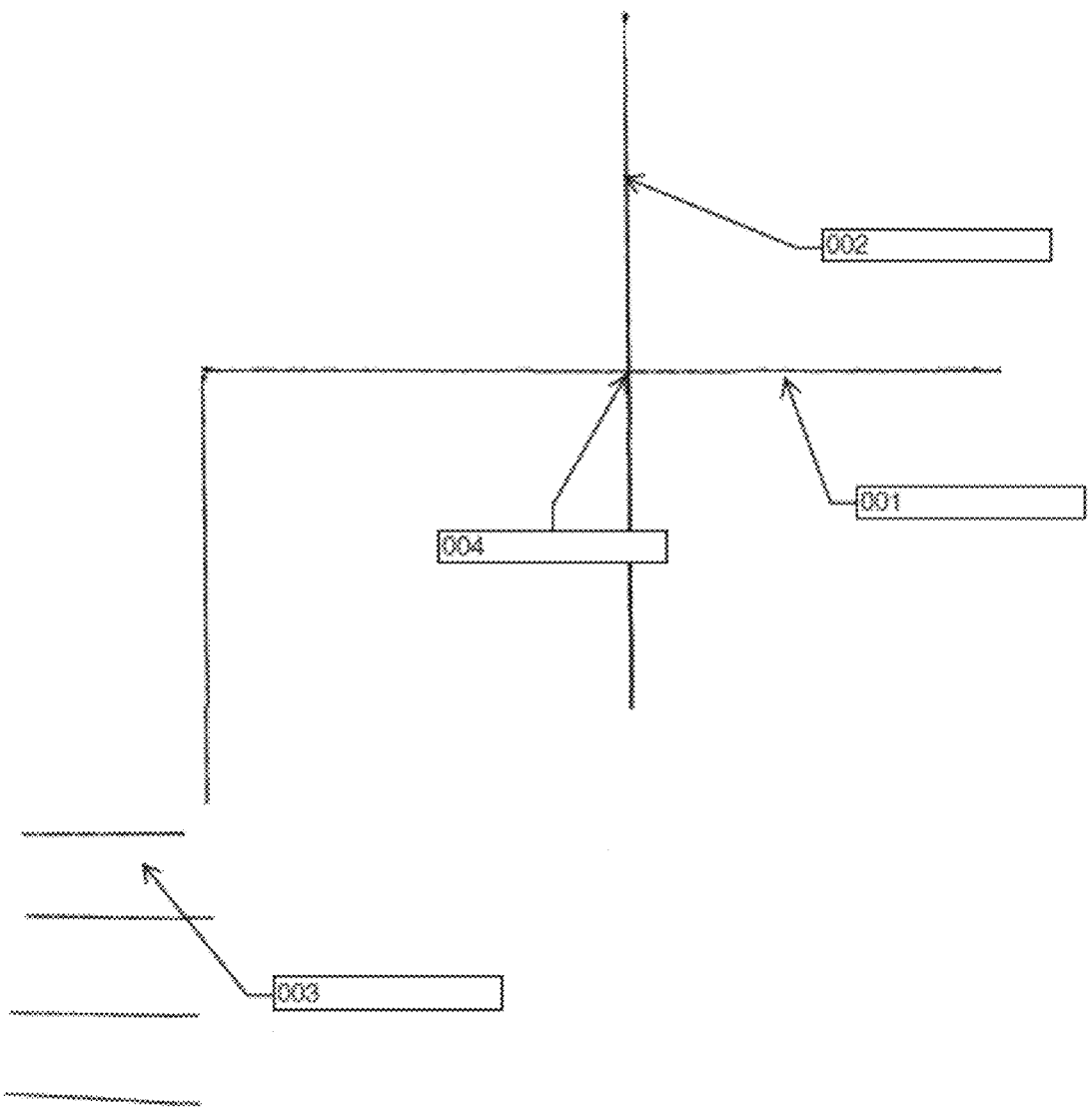
FIG. 1 represents the most basic rendition of a generic and a diversity engine working in combination.

The tool is an order of operations of other previous technologies where the order matters. If you do a cluster search on dog you end up getting a break down of what the internet thinks of dogs and then a generalized search on height within one of the dog's segmented clusters like video results of dogs, you end up narrowing a single cluster of dog (video results) down to a widdeled very focused popular answer relating to height. This is not what we want, nor what we are doing. But wonderfully, when you do a generalized search on dog, resulting in a pool, and then a cluster search on some measurement quality like heights or food on dog's pool, you end up with not only not narrowed answers but a spread of weights, heights, or food, but values for what the answers are worth to that pool Dog, out of percentages that answer represents to the pool, so you can make accurate assessments and generalizations about your entire chosen pool of dogs. A researcher performing this latter operation would then be in a position to take an accurate view of an elemental answer to the measurement as part of a whole because he can see the diversity within the measurement by relative strengths of each.

It works through a series of generic collecting searches and diversity categorizing processes where our tool collects data, like collecting a pool of rocks. And then after the rocks are collected, we choose to see all, all, of the collected ones by a particular measurable observable. It does not collect something larger and then narrow and refine it to rocks but instead uses an algorithm I will go into detail on later, simply to collect specifically what is asked for. Instead of narrowing like a mining tool down to fewer rocks, what it does is it uses every rock to get the answer and then it shows the whole rock collection by the particular vantage they were asked to be seen by. It takes the pool of rocks, a simple collected pool, and uniquely it does not say show me rocks that are five pounds, but show me every rock, but in terms of pounds, so you can see the spread of a pool or concept with breadth and the pieces of the spread in context. And the net result is you not only get an answer, but you get to see an answer and an answer's worth; the answer's worth to the whole species of the topic.

A sample use of the tool would be financial analysis of publically listed companies. This sector has been selected for an example because all of the information on companies listed on Stock exchange is publically available. This information includes, but is not limited to:

Quarter, Bi-Annual or Annual, Financial Statements, including Balance Sheet, Income Statement, Statement of Retained Earnings, Statement of Cash Flow.

Company's news through press releases and news agencies

Competition and sector standings through the same sources

Share prices and trends of sector, competitors and the company itself.

Management Structure

Some of the questions that tool would be able to answer by utilizing all this information would be:

Predict future trends on stock prices

Infer company's financial health

Place company within relative context to the sector

When researchers can ask a question to a pool as a whole, it is asking the question on something with a thickness and the answer from a thickness preserves something so much more valuable about the reality of the pool. It tells researchers the magnitudes: the answer, and it tells researchers, the directions: where the answer is leaning. The point of finding these magnitudes and directions, is to learn about the initial pool and only by a generic search before the diversity cluster, can you choose the initial pool, so you can choose what you want to learn and explore by the tool measuring things of depth by magnitudes and leanings. A strong utility of a diversity engine is to provide this spread, and a strong utility of the spread is as a comment on something the researcher interested in. If it cannot comment on something the researcher is interested in it serves very little purpose. This is why the tool needs to choose the data pool first that the diversity engine will work on and why current diversity engines serve little purpose without the combination of the two styles allowing this choice.

But the beautiful thing about a cluster function of a diversity engine, much beyond the current ability to dive by subtopics, is, more interestingly, it gives the range of subtopics, the diversity a search can be spread into. And the interesting thing for the researcher is not an element of an answer but the context of seeing the element within that total spread.

When a query is posed, after the tool collects the pool the user hopes to study, the tool presents the answers from that pool to the user's chosen metric by restricting the possibilities to clusters, dividing the user's initially collected data into clusters or categories. Once a category is selected in context of the others, it derives the contextual information from both the query and the user collected data, and with the help of correlation algorithms presents the user with an answer or number of answers. All the answers will have an associated data set(s) that will explore different dimensions of the answer(s). It is doing a Google, putting it in a box and then applying a Carrot2 to the material in the box. These mechanisms allow the user to see the meaning of the fact, figure, and answer from within context. Not any context, not overwhelming context, but relevant meaningful context with the spread of diversity and the strength of numbers of each.

A version of the tool could be tailored only to extract information from public and commercially available sources and therefore intended to target masses and achieve considerable penetration in the academic and research community. There is however another segment of the market, professional researchers for whom research is their job, and for whom require the use both public and commercial data sources and their own purpose built huge private data bank. Normally the privately collected data set makes basis of the corporate decisions whereas the other sources act as supporting evidence. This is because public and commercially available data (and sometimes even a researchers own data) are limited by current analytics to keyword searching that cannot make use of big data in any combination to arrive at new information. A version of the tool could be to only involve a single combination of the generic and diversity engine (not solving this problem) which creates the ability to present things in contextual reports but not to arrive at new answers. When a diversity can study multiple generically collected pools, it enables the isolation of variables and comparisons bringing the searcher not only to answers in context but can use information in combination to arrive at new information and answer questions too intense to solve today.

Another version can aim to unify private, commercially available, and public resources to make them act as harmonious useful and variable narrowing manipulable information and help corporates in analysis and to reach an informed decision. There are however number of technical challenges the tool conquers to make that dream a reality. The first one is that the computer needed to be able to take data, used in combination from multiple sources, to reach new conclusions on research problems. The primary limitation comes from the way data is stored. For public or commercially available information, the data is stored as essay type content and therefore has an associated context. The private data, on the other hand, is usually stored using relational schema and thus lacks any context. Specialized query languages are used for extracting information from such data. Combining these two paradigms, keyword search and query languages, will help gather results from all the sources and create a more meaningful picture.

This is a costly problem because it involves excessive manpower to perform basic but intensive research, and it imposes limitations on the amount of data, the size of studies we can include, and the number of variable isolating comparisons that can be studied, and in many cases leaves us with no decisive end result. This results in companies making ad-hoc decisions and excessive unproductive research spending.

The professional and alternate version of the tool, allows an electronic application of the variable narrowing scientific method. Like another less developed version the tool works through a series of generic and diversity search engines, where a generic is deep and topical, and diversity gives you the range of answers to a metric, organized by clusters. When the generic and diversity are used in combination on (like the diversity being used as a consistent metric across two variables also known as generic pools), this allows for researchers to compare previously unrelated, unconnected, and unwritten about combinations, material, by comparing unconnected pools by comparing per a consistent diversity metric When the same question is applied to different groups, tells researchers the information they want to know about the question. Research is done by compare and contrasting result sets to isolate influential variables and understand more about the problem, variable connection, and the result. The alternate version of the tool can have the ability to help researcher pose the same question to different data sets which creates the discovery process of research. The ability to choose the variables for exploring the question and with the help of multiple generics and diversity search operations in combination, seeking commonalities, differences, and multiple step searches, gives researchers the ability to compare and contrast, isolating variables of influence and reaching new understanding about the problems, connections, and result, making big, unconnected data useful and connectable. Mass data correlation allows for the isolation of smaller variables, reduces the cost of research, and improves our ability to answer research problems too complex to solve today.

EXAMPLES

There are two examples illustrated in drawings 8A-8H and 9. The examples show ways that the program can be used and formations of the program that would result in these useful scenarios.

Example 1

Example one shows how the program could go through a hypothetical medical research problem. It would begin with an initial cross search isolating out the contrast between reported differences in side effects of a brand name and generic drug. Example one is an experiment seeking to answer the question: "What are the structural differences between the brand name and its generic counterpart of a particular drug and how are these differences expected to take effect that patient population."

Figure 9:
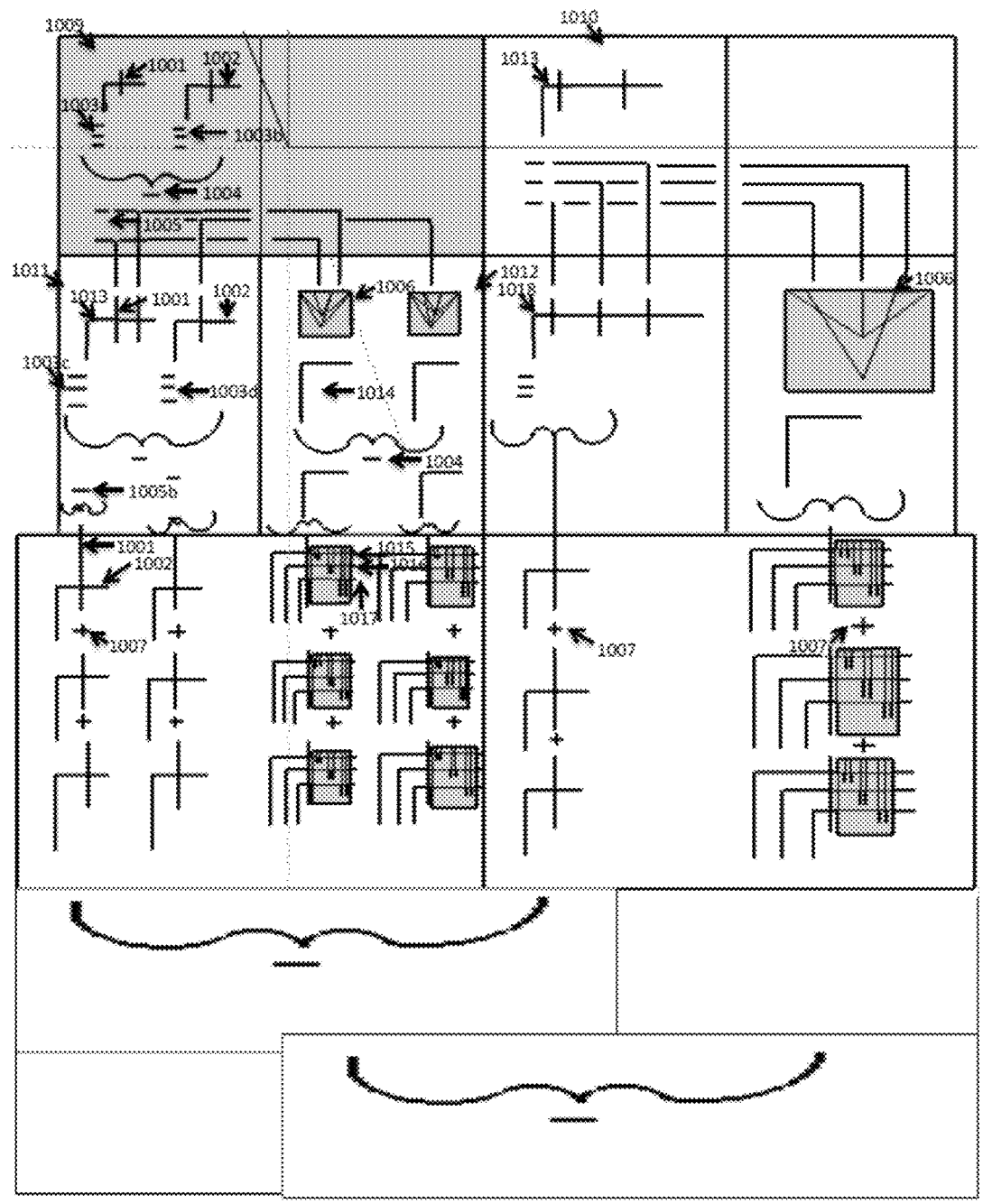
FIG. 9 represents a hypothetical medical research problem determining differences and reasons for differences between a brand and generic medication, illustrating an example of the tool.

In FIG. 9 an experiment is being conducted, using isolation by the data isolating research method. [1001] A researcher would begin by isolating items (variable factors) or interest through conducting a [1001] vertical or generic search. [1009] The experiment begins by comparing two different verticals [1001], right off the bat. In this example, vertical one will be a brand name drug and vertical two will be a generic of the same drug. Both are searched in this example through the horizontal [1002] 'side effects.' The answer will then be shown in that form, the form of the horizontal measurement, or in other words, all of the answers in this example will be side effects (ex. Weight loss, balding, blurry vision, and balding and itching. [1004] the results [1003] from each are then subtracted so each side is only left with the differences [1005], and the researcher begins with the different side effects that result from the brand and the generic drug [1009] (ex. Weight loss, blurry vision, vs itching).

Concurrently another half of the experiment would go on in our example [1010], and the other half seeks commonalities [1013] between those vertical brand and generic drugs.

To proceed with this experiment it would be advantageous for the researcher to be able to expand the class (of each) so he can find generalities about them (from a broader data set). As such the results [1005] from [1009]'s comparison and subtraction, become the verticals [1001] in the next level of the study [1011]. This time, as in [1013], commonalities are sought between the side effect vertical variables. The horizontal's we care about this time are the commonalities this constellation of side effects has in terms of various drugs [1002], so we keep the form of the answer as something useful [1003] for our class about drugs, drugs meeting the requirement of being in common with all of the differences in the side effects. Again we subtract [1004] the results from each other to leave differences, because if any drug held the constellation of both the brand and the generic's side effects, than it is not useful as a distinguished class [1005]. In this example the side effects are also taken in every combination [1014] with each other to see if there might be some combination of maybe less than all which has a commonality resulting in a class of drugs. These again are subtracted [1004] between the two lead variables (brand and generic (side effects)) to produce distinguished class of drugs between the two to study.

The concurrent alternative experiment seeking commonalities, is built up into a class as well. In finality the class construction, is barraged with horizontal measurements seeking any foundation for the commonality and class and the final results are added, and then subtracted (in their total, causes of the class) from the concurrent experiments (total causes of the class). And as the differences are gone, the result is only those components that make of the class defining why the brand and generic are different. The stages in unison allow for isolation of results concluding in discovery.

In example one, it will be important that the vertical (or generic) search collects relevant material to fill the variable. This can be made relevant in a number of ways including old and new algorithms, but specifically it can be made relevant by incorporating narrowing to the researcher before or as a component or preemptory component of the vertical search. Vertical or generic searches are such as google or directory narrowed like pub med. In example 1 the vertical had to collect all the material on the particular drug making up the variable. Useful components of a scientific vertical collecting function could include such as discrimination against quality of the data as well as relevancy. In the example the particular horizontal (or clustering) function seeks out subcategories. These can be found through a number of strategies, including a spinor matrix programming of the words as storage units, helping to provide context, or manually (as through social bookmarking), through logic and language rules, and many other options including current cluster functions. In the example, the horizontal measurement provides and seeks out the form of the answer, resulting in the diversity from that variable in that form, and the diversity's context. Metrics, gauges, observables, measurements: horizontal functions, are such as states, populations, colors, names, inches. The method and strategy of placing the vertical and horizontal measurement together creates the arrangements that allow for isolation and discovery. This tool as used in the example, could have been applied to the researchers own private data collection, his collection in combination with journals and pay for site, or in any other alternative, such as the Internet and the Internet and his personal collection.

Example 2

Example two is an illustration about soda research depicted visually in FIGS. 8A-H. It is a more visual representation of the vertical, horizontal components, and demonstrates again, how when results are used in later searches, or searches are made against each other, conclusions and commonalities from the data can be exposed.

INDUSTRIAL APPLICABILITY

This can be used by professional researchers as well as students and amateur researchers to help put information together to generate discovered results.

CITATION LIST

Patent Literature

Application Ser. No. 11/784,299 Publication number: US 2008/0086741 A1 Filing date: Apr. 6, 2007; application Ser. No. 11/417,821 Publication number: US 2007/0037587 A1 Filing date: May 3, 2006

Non Patent Literature

The literature on the component parts of the tool including vertical and horizontal or diversity and generic engines can be found on the Internet, through interviews with other search engine builders, and dialogs on the Internet. Both vertical and horizontal engines are being constructed and are in practice today, and someone skilled in the art would know where to start to build them. The unique combination, that putting them together in this way results in the creation of new knowledge by isolating causations and connections is a computer extrapolation of the scientific method. The inventive step is recognizing how the two technologies are mathematically different, and using them by an order that results in a weaving or new creation by allowing data to be connected and researched. Information on the scientific method is also available in literature and on the Internet.

Provisionals incorporated in total:
61/350,089 and 61/452,098

DESCRIPTION

The following patent is a patent for a 'cross search' based, data isolating research tool. Simply put it is designed to allow the user to the choose the data sets they are asking the question to, by a series of vertical/generic and horizontal/diversity search engines which serve to collect and isolate the data and then analyze through and only through the collected data with the horizontal clustering engine. This enables the possibility of comparing two previously un-compared and unlinked things through a comparison of them as to a metric. The design of it is to make massive data useful for scientific research by the scientific method in order to enable advancements in research as well as basic searching for concepts not contained in any unified manner on a single site, through inferences enabled by the particular combination of the vertical and horizontal tools.

Vertical or generic search engines are deep and topical 'expedia type/pub-med/google type' collection and isolation will be achieved.

And horizontal or diversity search engines provide the diversity of a concept, aka the range of subcategories of an initial category usually presented in clusters of similar domain subcategories (here found through/within the data of the vertical) 'clusty type'.

The tool works through a series of vertical and horizontal engines, used in combination, where the vertical is what enables the user to choose the data pool to select what is of interest to him, and where the horizontal, applied to the vertical collection, is what collects and displays the range of results to a given metric-query (request for form of result), contained within.

The tool is an order of operations of other previous technologies where the order matters. If you do a cluster search on dog you end up getting a break down of what the internet thinks of dogs and then a generalized search on height within one of the dog's segmented clusters like video results of dogs, you end up narrowing a single cluster of dog (video results) down to a widdeled very focused popular answer relating to height. This is not what we want, nor what we are doing. But wonderfully, when you do a generalized search on dog, resulting in a pool, and then a cluster search on some measurement quality like heights or food on dog's pool, you end up with not only not narrowed answers but a spread of weights, heights, or food, but values for what the answers are worth to that pool Dog, out of percentages that answer represents to the pool, so you can make accurate assessments and generalizations about your entire chosen pool of dogs. A researcher performing this latter operation would then be in a position to take an accurate view of an elemental answer to the measurement as part of a whole because he can see the diversity within the measurement by relative strengths of each.

The tool works through a series of generic collecting searches and diversity categorizing processes where our tool collects data, like collecting a pool of rocks. And then after the rocks are collected, we choose to see all, all, of the collected ones by a particular measurable observable. It does not collect something larger and then narrow and refine it to rocks but instead uses an algorithm I will go into detail on later, simply to collect specifically what is asked for. Instead of narrowing like a mining tool down to fewer rocks, what it does is it uses every rock to get the answer and then it shows the whole rock collection by the particular vantage they were asked to be seen by. It takes the pool of rocks, a simple collected pool, and uniquely it does not say show me rocks that are five pounds, but show me every rock, but in terms of pounds, so you can see the spread of a pool or concept with breadth and the pieces of the spread in context. And the net result is you not only get an answer, but you get to see an answer and an answer's worth; the answer's worth to the whole species of the topic.

When we can ask a question to a pool as a whole, it is asking the question on something with a thickness and the answer from a thickness preserves something so much more valuable about the reality of the pool. It tells you the magnitudes: the answer, and it tells you, the directions: where the answer is leaning. The point of finding these, magnitudes and directions, is to learn about the initial pool and only by a generic search before the diversity cluster, can you choose the initial pool, so you can choose what you want to learn and explore by the tool measuring things of depth by magnitudes and leanings. The whole point of a diversity engine is to provide this spread, and the whole point of the spread is as a comment on something you're interested in. If it cannot comment on something you are interested in it serves very little purpose. This is why you need to choose the data pool first that the diversity engine will work on and why current diversity engines serve little purpose without the combination of the two styles allowing this choice.

But the beautiful thing about a cluster function of a diversity engine, much beyond the current ability to dive by subtopics, is, more interestingly, it gives you the range of subtopics, the diversity a search can be spread into. And the interesting thing for us is not an element of an answer but the context of seeing the element within that total spread.

When a query is posed, after the Tool collects the pool the user hopes to study, the tool presents the answers from that pool to the user's chosen metric by restricting the possibilities to clusters, dividing the user's initially collected data into clusters or categories. Once a category is selected in context of the others, it derives the contextual information from both the query and the user collected data, and with the help of correlation algorithms presents the user with an answer or number of answers. All the answers will have an associated data set(s) that will explore different dimensions of the answer(s). We are doing a Google, putting it in a box and then applying a Carrot2 to the material in the box. These mechanisms allow the user to see the meaning of the fact, figure, and answer from within context. Not any context, not overwhelming context, but relevant meaningful context with the spread of diversity and the strength of numbers of each.

A more advanced creation of the Tool, allows an electronic application of the variable narrowing scientific method. Like the basic the tool works through a series of vertical and horizontal search engines, where a vertical is deep and topical, and horizontal gives you the range of answers to a metric, organized by clusters. When the vertical and horizontal are used in multiples together (like the horizontal being used as a consistent metric across two variables also known as vertical pools), this allows for researchers to compare previously unrelated, unconnected, and unwritten about in combination, material, by comparing unconnected pools by comparing per a consistent horizontal metric Just as, planting the same seed in different soils tells you something about the seed, measuring the differences in the pools of answers, when the same question is applied to different groups, tells researchers the information they want to know about the question. Research is done by compare and contrasting to isolate influential variables and understand more about the problem, connection, and result. The Tool's ability to choose the data set to ask the question on gives researchers the ability choose the variables to explore the question by and the professional's ability to use multiple verticals and horizontals in combination, seeking commonalities, differences, and seven step searches, gives researchers the ability to compare and contrast, isolating variables of influence and reaching new understanding about the problems, connections, and result, making big, unconnected data useful and connectable. Mass data connectability allows for the isolation of smaller variables, reduces the cost of research, and improves our ability to answer research problems too complex to salve today.

A desired problem the engine could research would be the research question, "what are the structural differences between the brand name and its generic counterpart of a particular drug and how are these differences expected to take effect in that patient population."

The problem would involve multiple steps of cross search to the reach the result, each involving a vertical collecting relevant data, a horizontal pulling up a concept's sub category, a relationship between the vertical and the horizontal, and the various forms/display methods of the result.

The particular vertical can be improved by incorporating a user based search tool like algorithms including in the search, features that the user has entered about himself in entering the site or for the specific search, to aid more specialized narrowing for scientific purposes and instilling meaning into common words, in addition to language association traditionally used by these engines.

The horizontal can be made to incorporate more of the correct responses through a mechanism of "patterned recount" which is essentially, after a word has been tagged relevant to a particular horizontal metric through such as direct language pointing etc. that word would be recounted even if it exists within the vertical without the particular language markers (this obviously would be imperfect as some words have double meaning but by the topical specificity of the vertical selection and proportionately limited frequency of topically similar conflicting meanings, it is more accurate to count them).

Other items that might be of interest are appropriately expanding the vertical to include other relevant pieces that are encapsulated by the combination of the vertical and the horizontal but coded as a different name. And the potential of assigning meaning to the horizontal through the broader data set of the internet at large and then applying those terms into the patterned recounted as well, as a scalable function of the specificity of the search metric.

Illustrations

FIG. 1 represents the most basic rendition of a generic and a diversity engine working in combination. [002] in this image represents the task of performing a generic search. It also represents saving that material (or setting aside), that material saved (or set aside). There are many ways a generic search can perform this task and result this collection, most namely by generic first generation searching (google, bing, lexis, pub med). [001] is this image represents the diversity search function as well as the request for the form of the result, the metric. [004] in this image represents the diversity engine acting on and through the data from or within the generic search collection. [003] in this image represents the results in the form of [001] but from the data of [002], clustered categorically.

Figure 2:
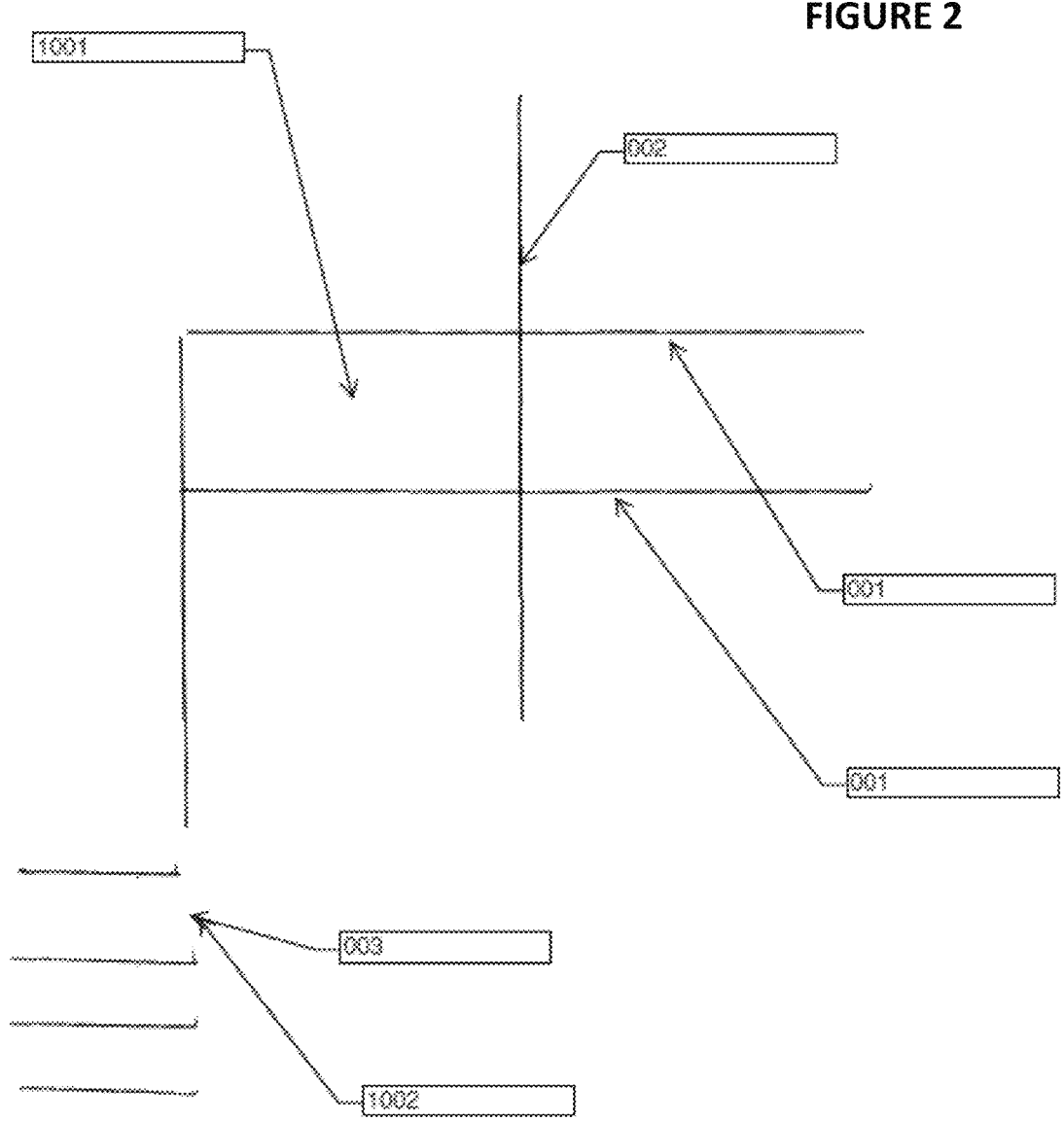
FIG. 2 represents the same basic generic and diversity engines working in combination, but this time it is shown where the result is seeking an answer both of the metrics [001], and is found within the generic collection [002].

FIG. 2 represents the same basic generic and diversity engines working in combination, but this time it is shown where the result is seeking an answer both of the metrics [001], and is found within the generic collection [002]. [1001] in this figure represents the diversity engines taken in combination, looking through the generic's pool. [1002] in this figure represent answers meeting the metric criteria for both diversity requests [001], as found through this generic search [002]. It is looking for commonalities in the cluster by the first term [001] and the clusters clustered by the second term [001], through the generic pool [002].

Figure 3:
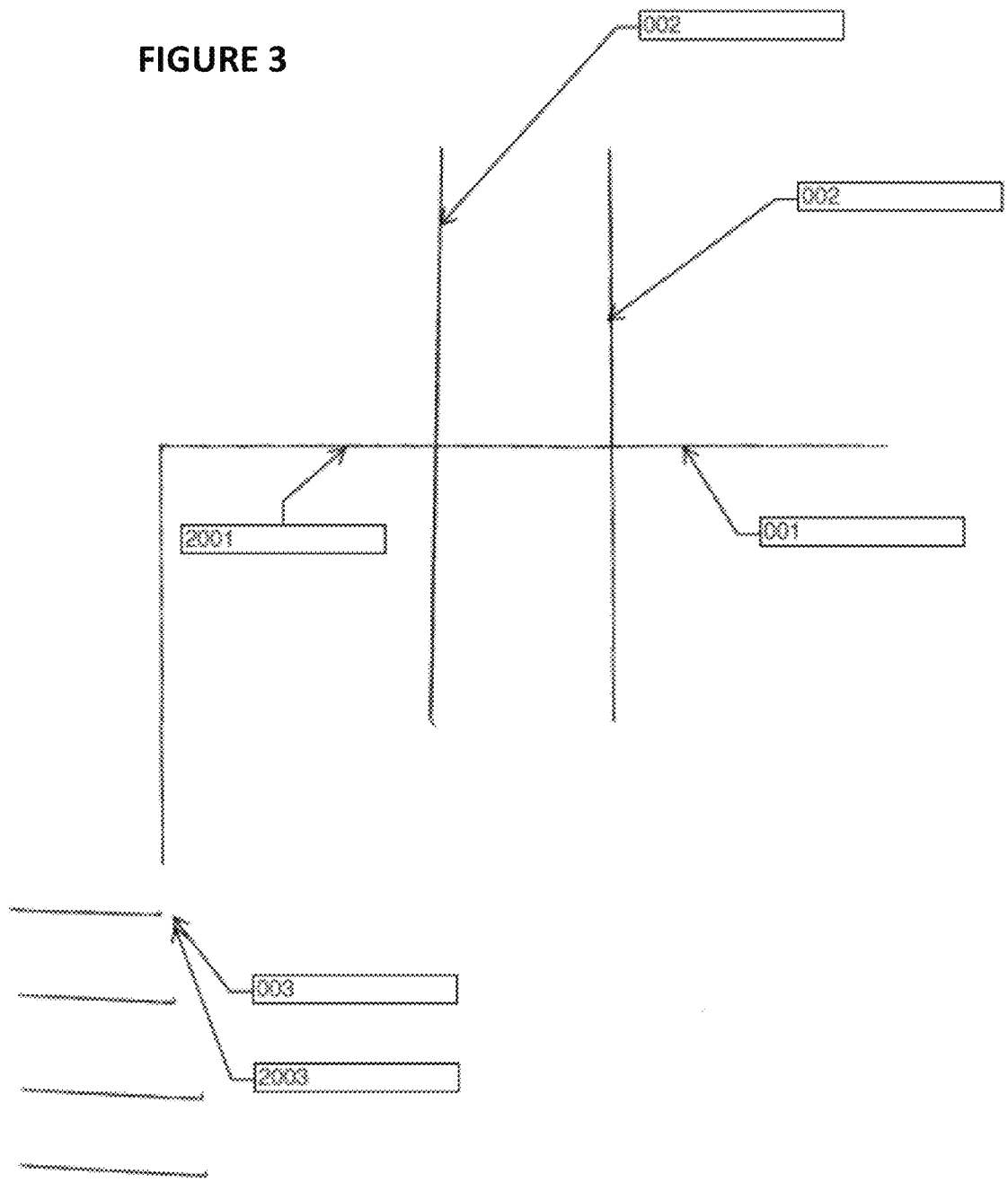
FIG. 3 represents searching by a diversity engine looking for commonalities through multiple generic pools between them.

FIG. 3 represents searching by a diversity engine looking for commonalities through multiple generic pools between them. [2001] represents the data meeting the diversity request [001] that was found in both pools [002]. [2002] represents commonalities to the diversity metric [001] between two or more generically collected data pools [002].

Figure 4:
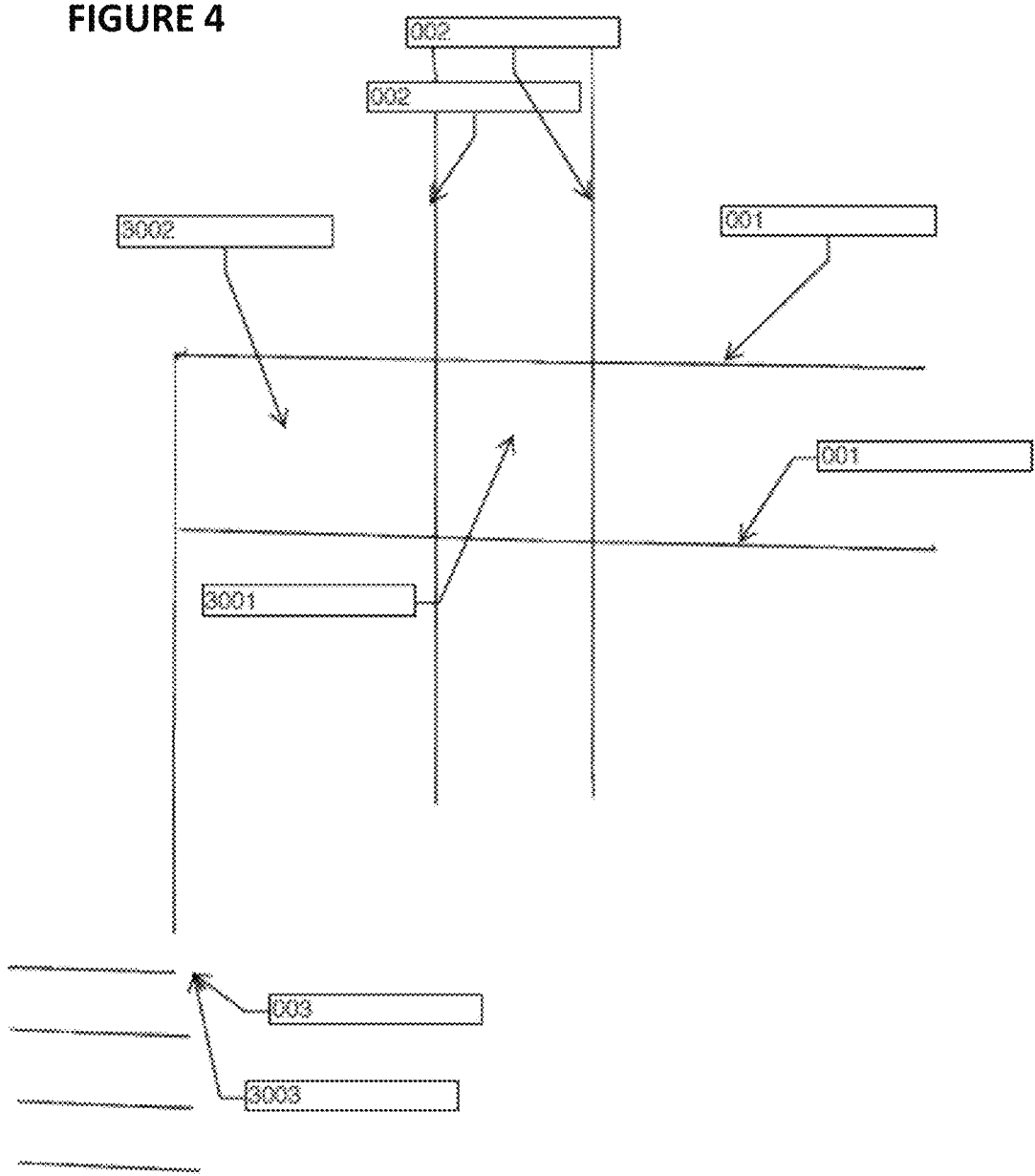
FIG. 4 represents a search for the form of the answer meeting two diversity metrics.

FIG. 4 represents a search for the form of the answer meeting two diversity metrics [001] and found common between two or more generically collected pools [002]. [3001] represents the two diversity search metrics [001] in combination. [3002] represents the commonalities to the two generic pools [002] being clustered by the diversity terms used combined [001]. [3003] represents a cluster, clustered by the diversity terms [001] through the commonalities in the generic pools [002].

Figure 5:
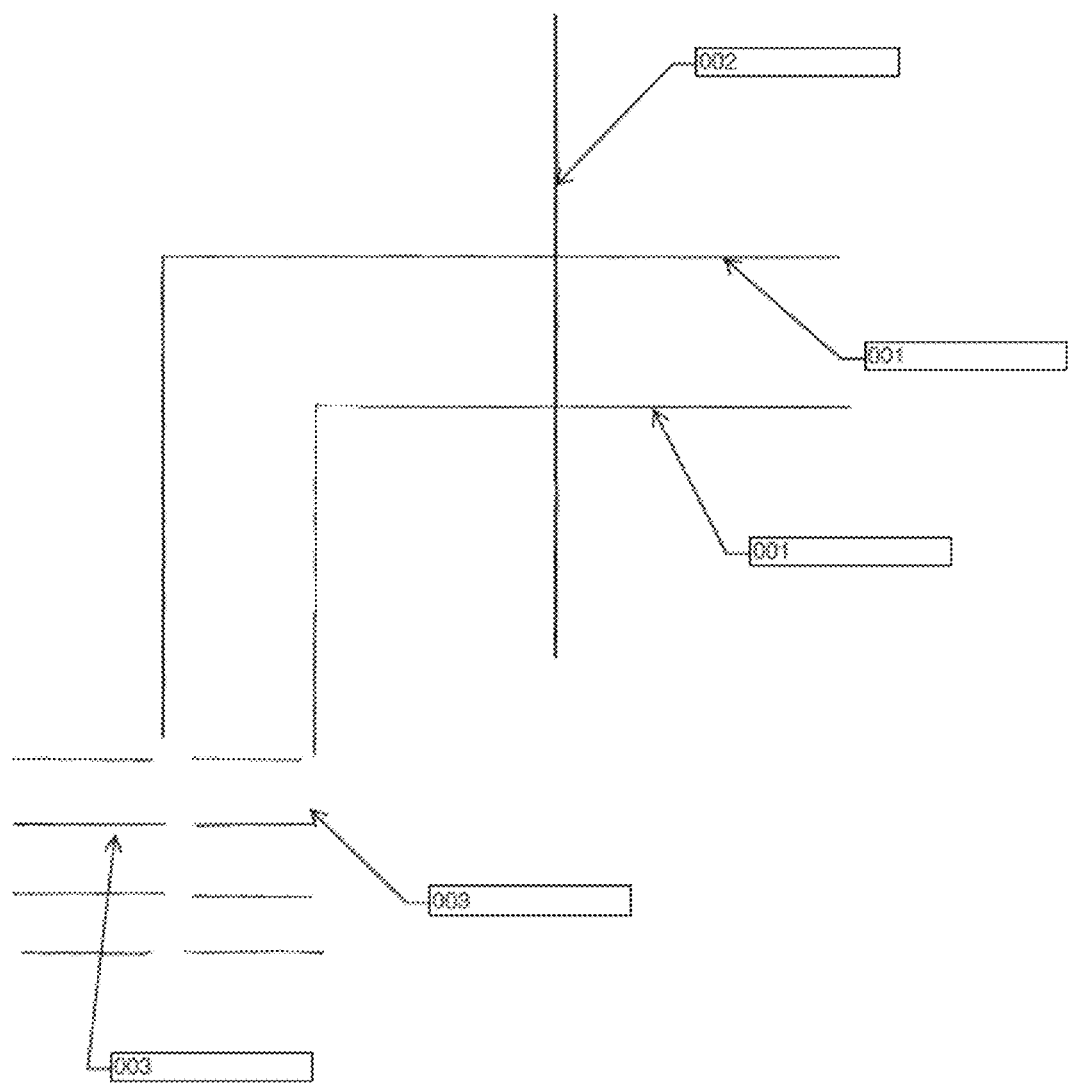
FIG. 5 represents one generic pool being clustered to two or more different things all separately.

FIG. 5 represents one generic pool being clustered to two or more different things all separately.

Figure 6:
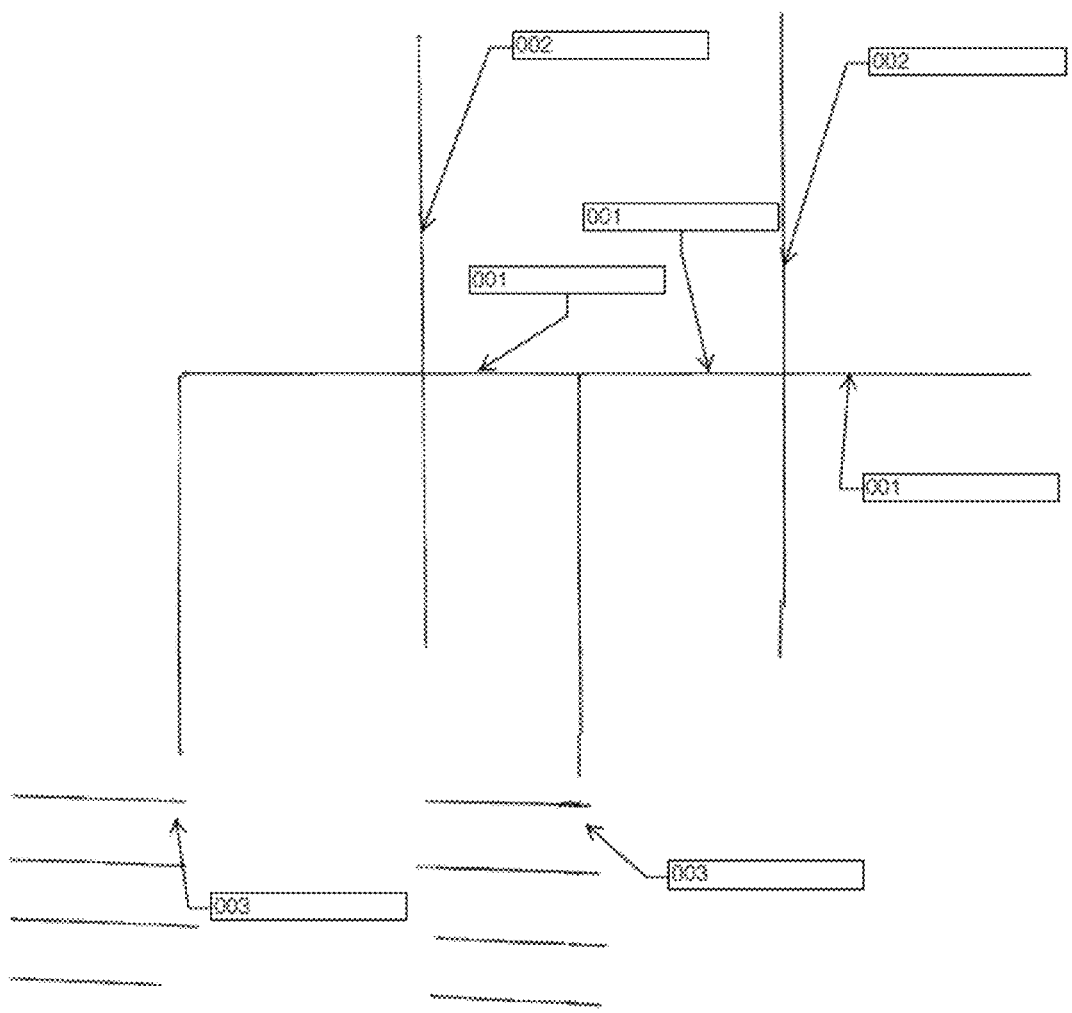
FIG. 6 represents one question clustering two different pools by the same term but separately.

FIG. 6 represents one question clustering two different pools by the same term but separately.

Figure 7:
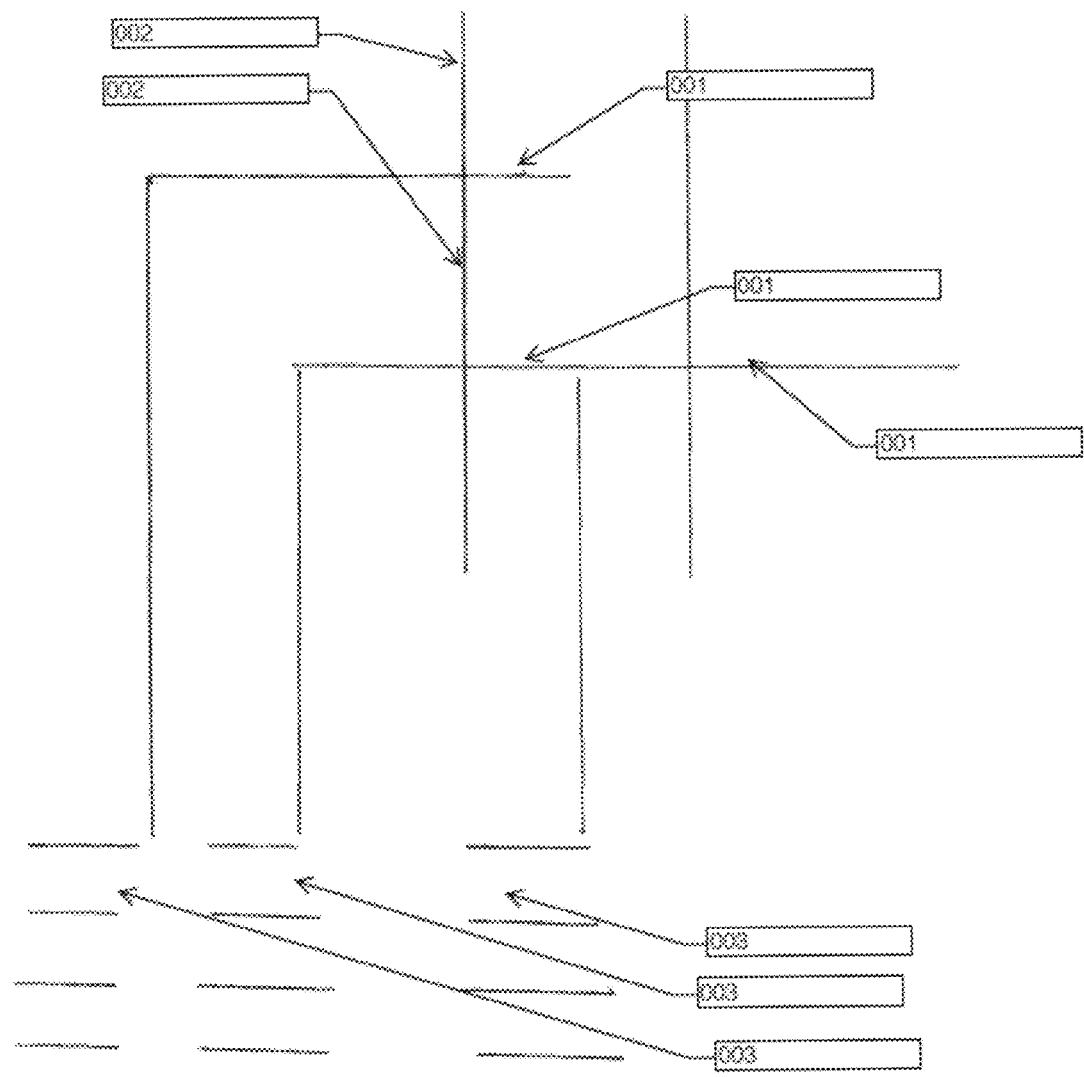
FIG. 7 represents a situation where the research is interested in a generic pool [002] clustered [001] two different ways, compared against another generic pool [002] clustered [001] by one of the same ways.
Figure 8A:
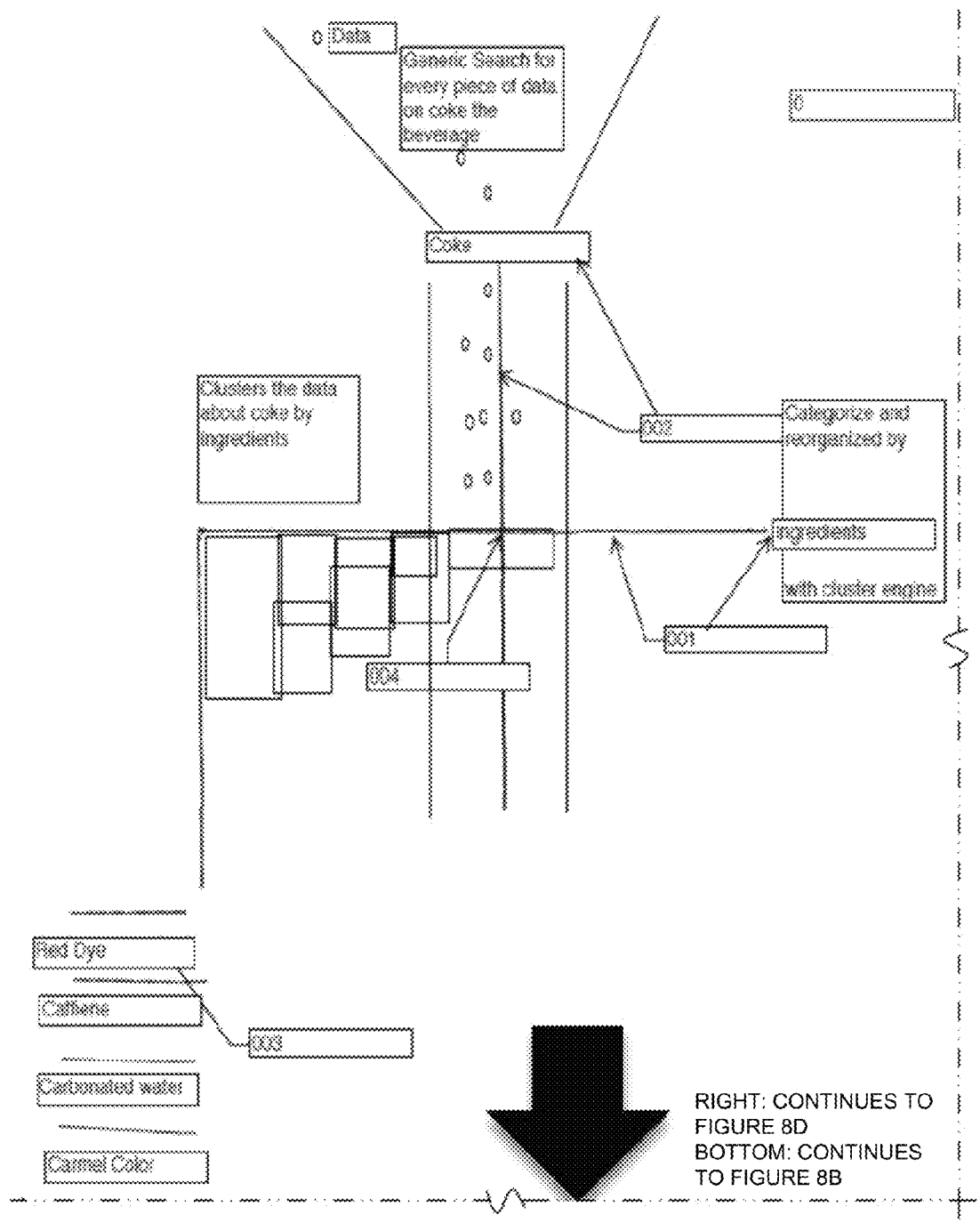
FIG. 8A-H represents the process of the cross search using a hypothetical example of soft drink research.
Figure 8B:
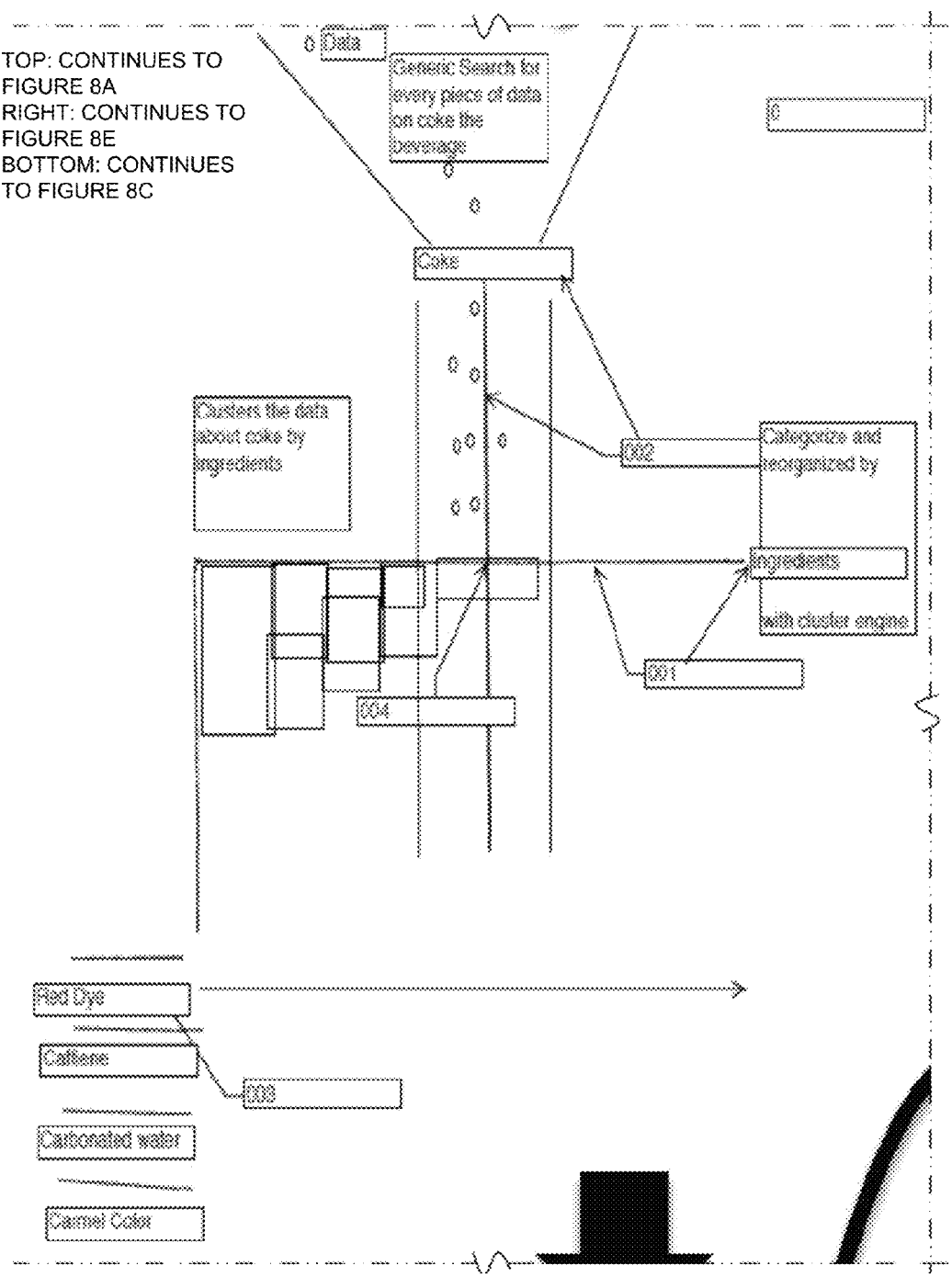
Figure 8C:
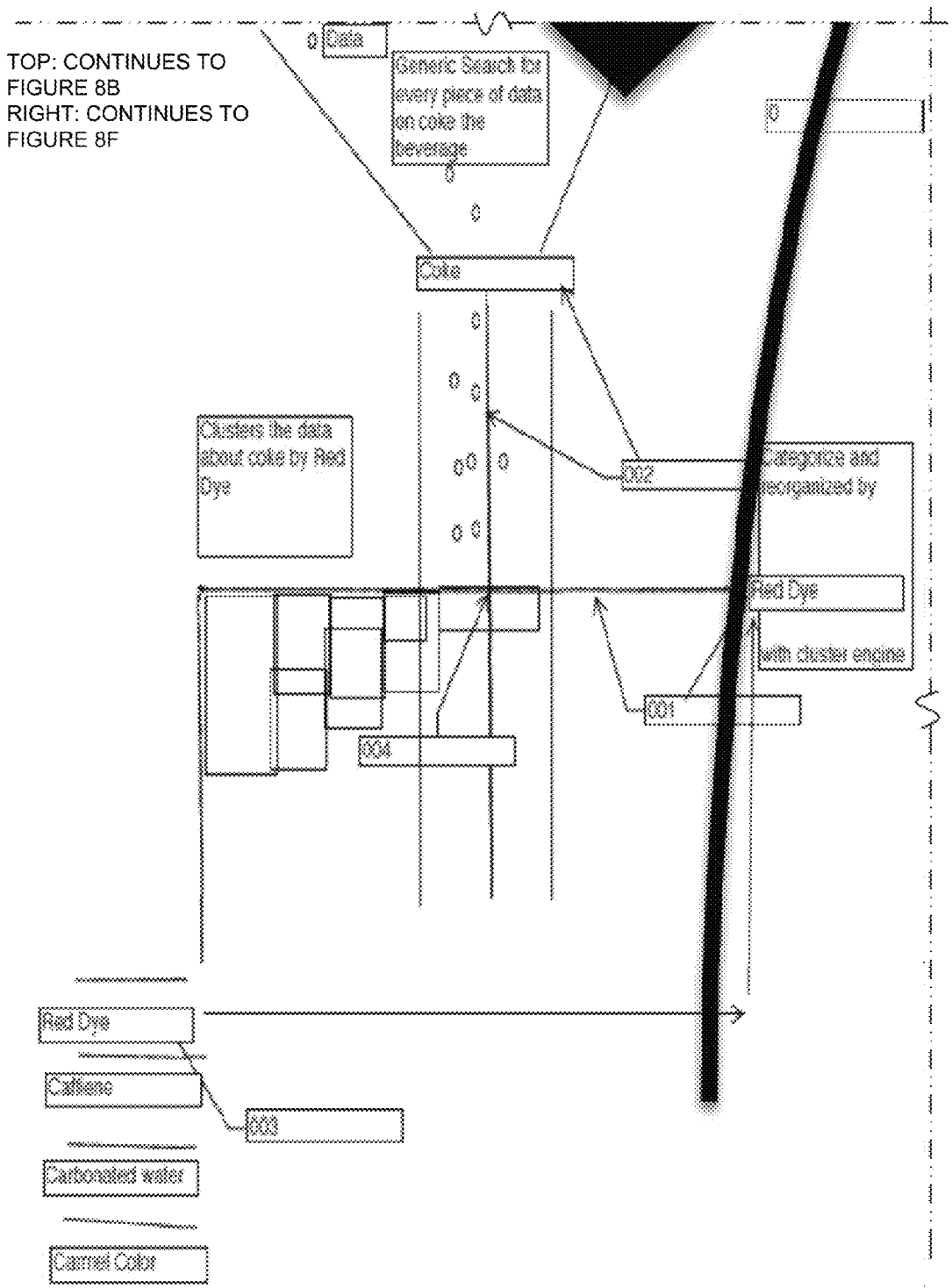
Figure 8D:
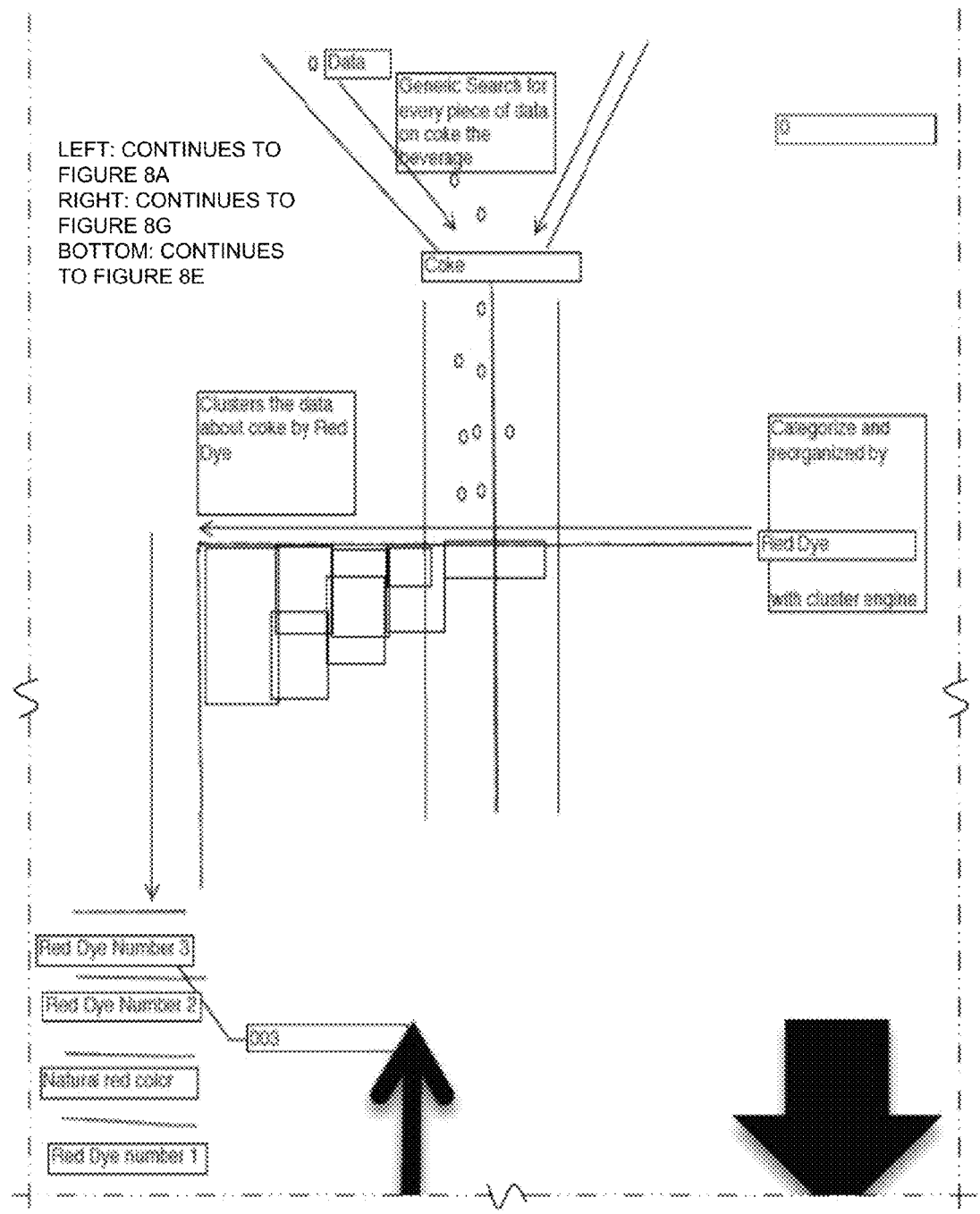
Figure 8E:
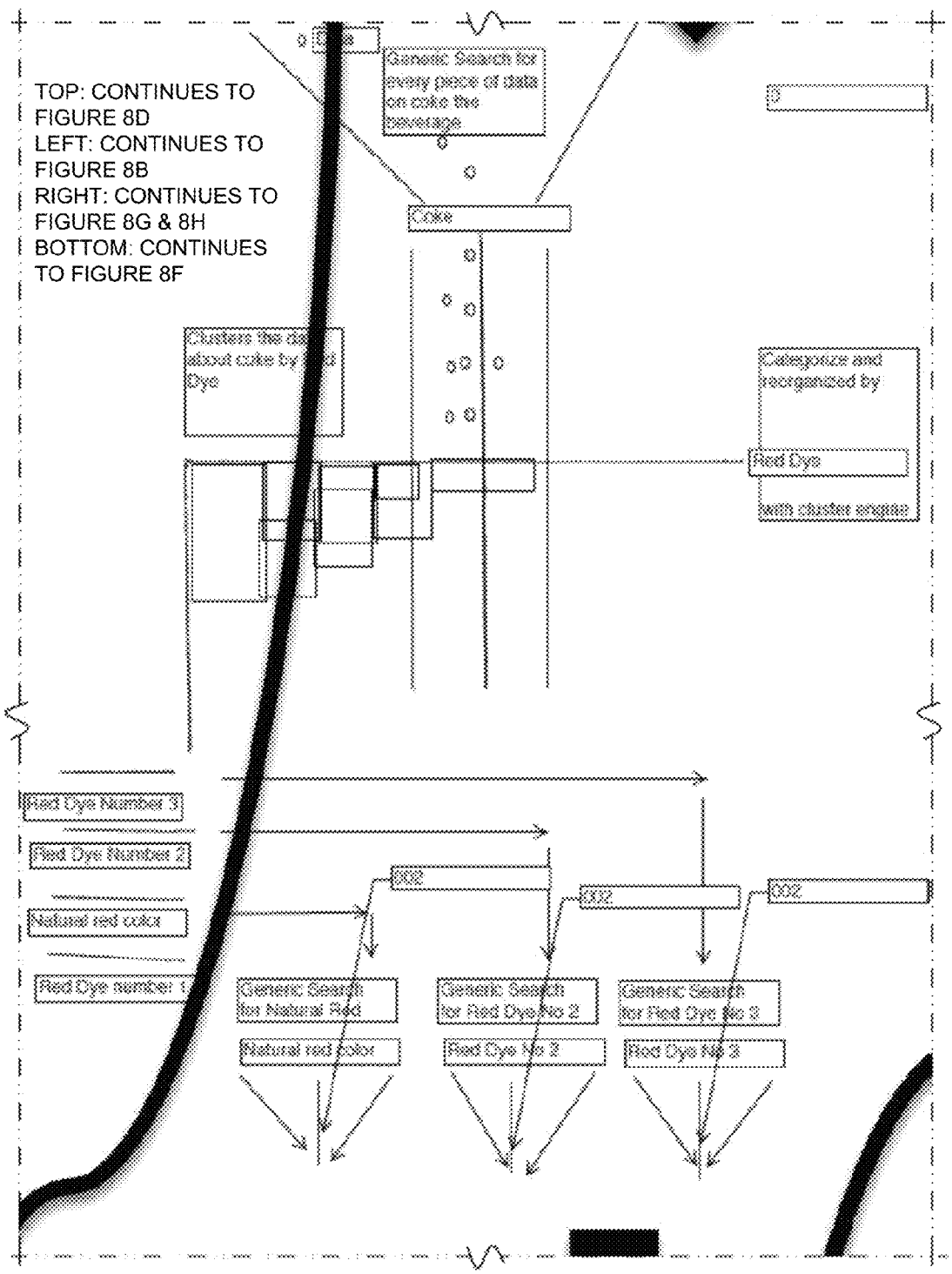
Figure 8F:
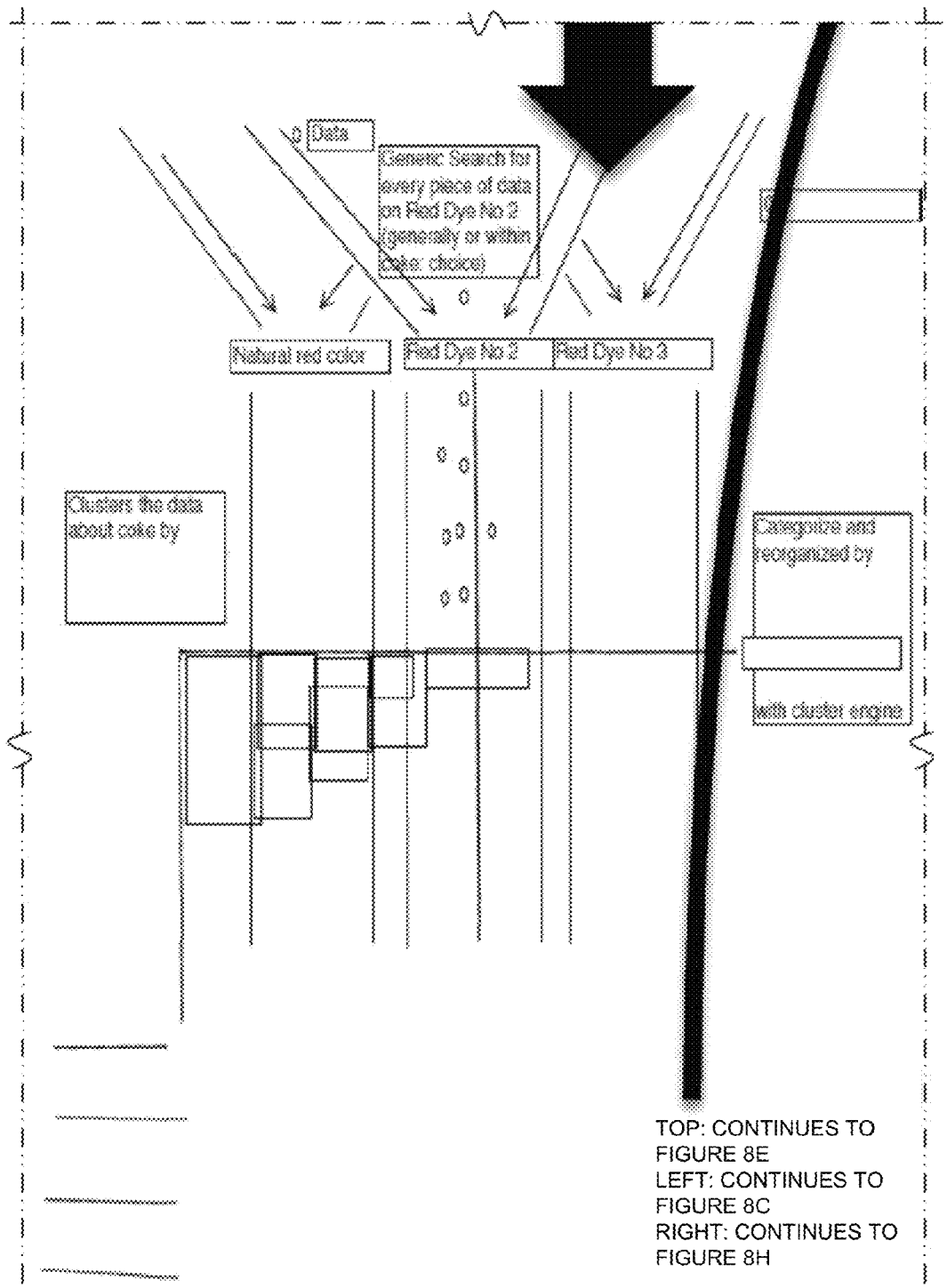
Figure 8G:
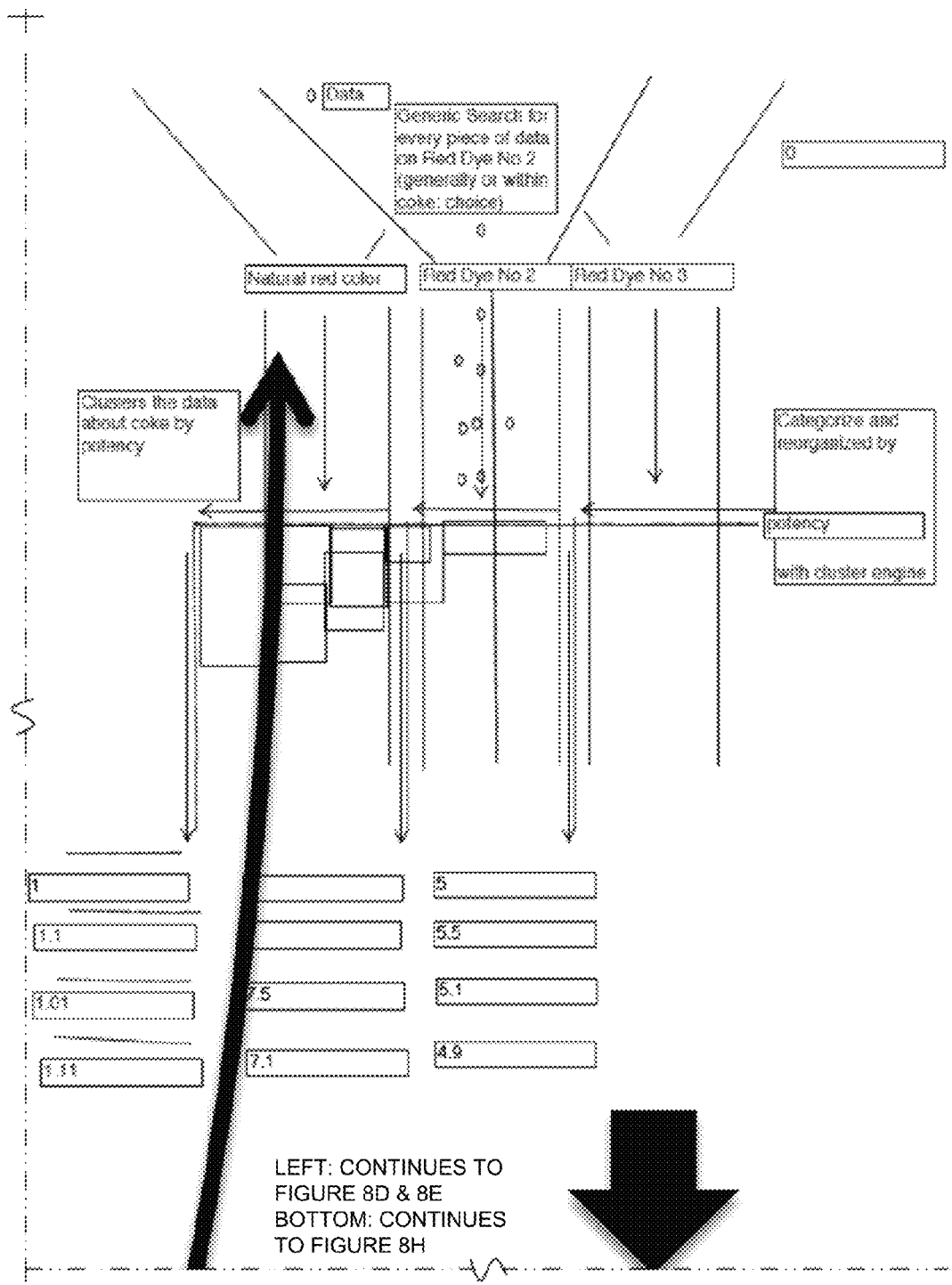
Figures 8E, 8F, 8G, 8H:
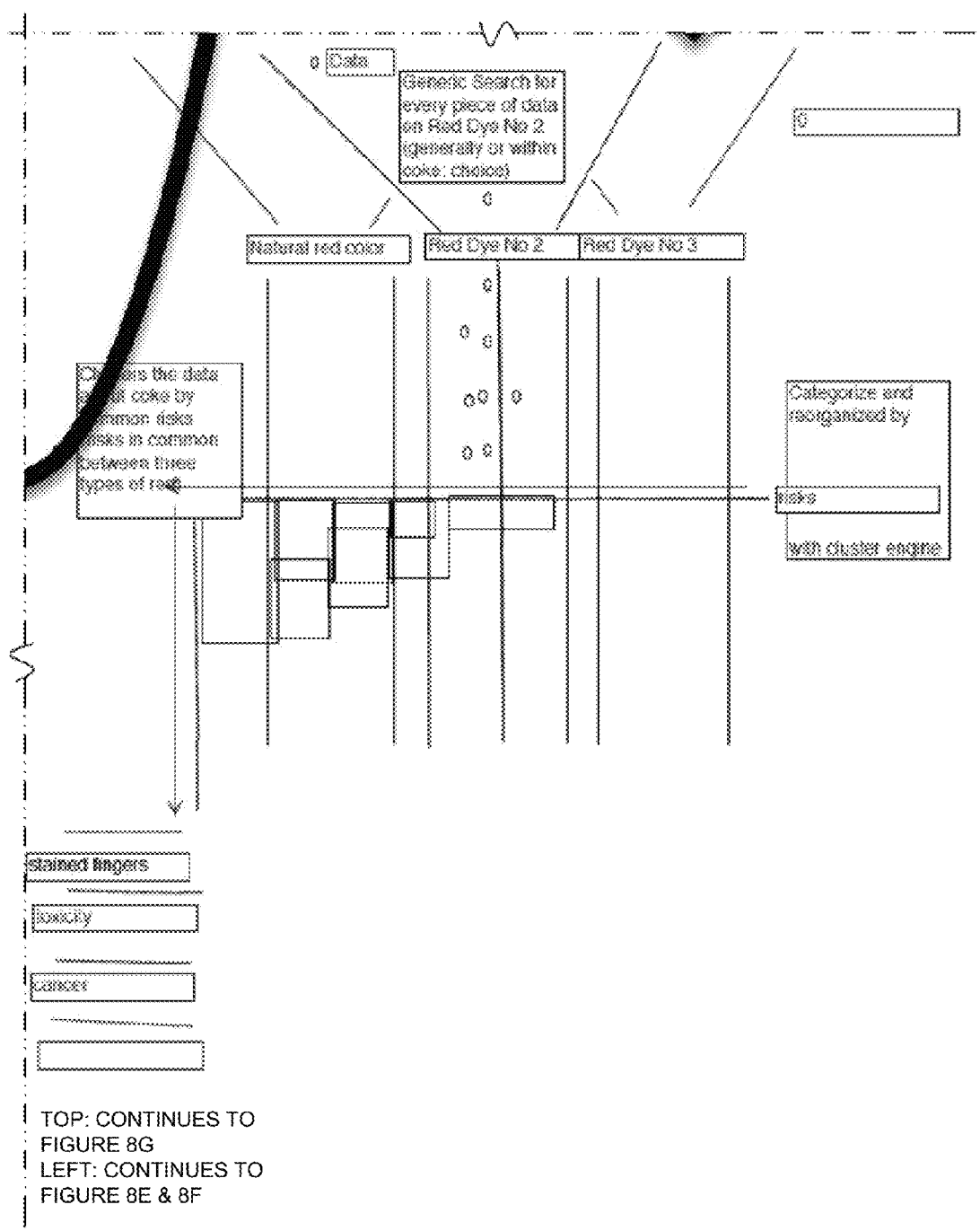

FIG. 7 represents a situation where the research is interested in a generic pool [002] clustered [001] two different ways, compared against another generic pool [002] clustered [001] by one of the same ways.

FIG. 2 represents the first layer of the cross search technique to answer the query, beginning with a comparison of a topic like side effects being asked as the relevant metric to compare to find differences across the brand, and the generic counterpart.

FIG. 3 represents layer one of the search

FIG. 4 represents layers one and two of the search

FIG. 5 represents layers one and two of the initial search and a parallel inquiry on the commonalities.

FIG. 6 represents the first three layers of both searches

And FIG. 7 represents the conclusion reached by the fourth layer.

The following is retained in whole from the provisional patent application 61/350,089.

TECHNICAL FIELD AND INDUSTRIAL APPLICABILITY OF THE INVENTION

This invention relates to the machine, manufacture, and process involved in the research tool that applies the scientific method through data sets and the Internet. The present invention relates particularly to an electronic means of isolating data, and clustering categorically through.

BACKGROUND OF THE INVENTION

New search techniques have revolutionized research over the past decade such that answers that had been confined to isolation are achieving connection to relevant users by a rate of rapid web accretion. Science 2.0 promotes the idea that research science, including pharmaceutical research, can be improved by a collaboration effort made possible by communication via the Internet. The component of this that has been yet unexplored is beyond communication, electronic evaluation and the combination of publicly accessible material as larger data sets in combination can and should be used to improve research by the scientific method by expanding data pools, and opening the possibility to hold smaller variables open across comparatives.

While the successes of current technologies hold great potential for decreasing the cost of and increasing access to research, the answer to broadly conducting research at a low cost still requires solving a series of significant problems including the limited amount of data that can be researched by the piecemeal method, the lack of uniformity of applying the scientific method, the minimal testing of comparables, and the lack of conclusions on variables that are too small or varied across experiments. These problems in total create the reduced ability to form connections between results, which could help in a less expensive evaluation and fundamental understanding of pharmaceutical medications, business creation, and physics. The greatest amount of these issues occur during the process, creation and application of the scientific method.

Research through the current Internet tool and location finder of searching uses connection and networking theory to lead the user to a result. In limiting our research to such tools we encounter the aforementioned obstacles. This results in insufficiently applicable research and results because an answer based on a singular source that has been well reviewed does not allow us to see the underlying elements that made an answer the right answer, that connected two most popular results, and that would flesh out more detailed elements not defined enough by a single source nor illuminate the contrary opposition.

In an endless struggle to improve the precision and accuracy of research, search engines developed into highly specialized vertical and horizontal engines.

Horizontal engines can broaden diversity and vertical engines can focus results, but neither allows the comparison of data by the scientific method. The solution is to use the progress of the search technology in a combination that allows for the possibility of a variable question to be asked to discrete data quantities.

The Invention

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to or combined without limiting the scope to the embodiments disclosed herein.

A method of cross searching allows researchers to perform searches by the scientific method. A cross search would be any search conducted by a series of verticals and horizontals, that when used together create a variable metric and a comparison ability. The horizontal is a categorical search yielding the broadest range of results associated with a category while a vertical search is a focused search, which brings you things most closely associated with your topic. A vertical can be used to identify selective and comparative data pools that the horizontal will functions through as the metric that going through the vertical data pools and allowing you to see the information within by that metric.

Horizontals through verticals create a variable metric, or variable ability to ask a question of the data. The horizontal creates a hinge so you are able to ask a question separate from seeking your pool of results and the question is the metric way you see your answers. The same metric (horizontal) through all the data collected by the vertical/s generates answers to the question that are that vertical's subcategories of the metric. When these are ranked like by order of occurrence, it creates the comparative ability because by a consistent metric you can compare and contrast different variables by shared and unshared components of results. The results can be used in concert as more extensive data pools representing classes that have been defined by the previous search terms, in which answers from question to a class represent qualifications of the class as a whole. On that same hand multiple vertical data sets can be used in singular to concert, to optimize results towards particular questions, and can be used in singularity to compare or contrast results.

In lay men's terms, the same question though different things is 'the scientific method.' It can work merely by clustering horizontals though differentiated verticals and ranking them. The goal would be to RESEARCH data through an open data set and the Internet, where research doesn't mean to take researchers to data, but means to take the researcher to answers generated through, in order to create a more fundamental picture of a drug, business, or principal, and to conduct multi-variable research on broader data pools of test subjects at a decreased cost.

Cross searching will allow researchers to perform scientific method research. The method will open research to broader data sets, better the potential results for deep level research, and universally reduce complications related to differentiated starting conditions and variables that are too small. In total the procedure will cause better research possibilities, open them to the more general population, and reduce knowledge acquisition processing fees by using a repeatable process that applies the scientific method to computerized data, creating research from it, through the transformative process of the verticals and horizontals.

Process

The process of a cross search engine involves a horizontal search acting through a vertical, where a horizontal is a broad diverse search that functions to find the categorical range of a category, searching within the vertical or deep topical search that can function to select the data pools. The process involves electronically combining data isolation with categorical association whereby the two together generate relational results.

To use the process of a cross search, a user can chose a data pool, or pools, and chose a metric to view the data by. This can be performed by such actions as putting a search term in a vertical engine isolating data sets of his choosing and then putting a term into the horizontal engine to see the information in his vertical searching by a chosen metric. The vertical may have more components, where the user my have to choose the type of data he is interested in, by his research characters, etc. or it may be as simple as choosing the data the research wants to isolating, choosing the metric he wants to see and company them by.

In some versions of a cross search engine, the user may be offered a decision of the variety of ways he would like the horizontal to go through the vertical including but not limited to, choosing the combination of multiple verticals and horizontals and/or further layering of the questions whereby answers become questions or pools themselves.

The user then sees the information, displayed in a way he could have chosen or that is presented automatically. It is when the user conducts a data isolating search as by a vertical search engine and then within that conducts a secondary analysis as by a metric, with such as a horizontal search, that the user performs the process creating the cross search. The rest of the steps are best mode accompaniment but not necessary.

An example of the users experience and process of conducting a cross search would be as follows: say a user wants to know how to sew a buttonhole with a Kenmore 15 sewing machine. The user's process of conducting a cross search could be as simple as to speak/type/photograph/enter it as a question and the cross search could guide the user in how to break it down into pools and metrics, or it can be as complicated as the user adding his own data to the program, and signaling to the program, exactly how he would like to separate it into the distinct pools seen by his chosen metric. In our example of the Kenmore 15 sewing machine, the data pools would eventually be, the Kenmore 15 and the buttonhole. In some versions of the cross search program, the user could then choose the formation of how the metric will analyze through the data, though in more simple versions, the use may not be given a chose. In our example of the sewing machine, the user process might include choosing that the same metric would run through both verticals whereby, the resulting subcategories of that metric through the two pools would represent subcategories of the viewing metric common to both of the verticals such being the Kenmore 15 and the button-hole. In our example, the user could choose to view the data by the metric, stitches or by the metric, instructions. If the format of the horizontal through vertical is such that stitch is being located in both, and only shown when common to the two, then if there is a case where the stitch or instruction type exists in both categories, then the user concludes that that stitch or instruction, is how to sew the stitch of a button hole of the stitches available to the Kenmore 15 or in other words, that is the stitch to sew button holes with that machine, as the same result existed in both places, whether or not an article had been written encompassing both ideas before, simply by the observation that it is the stitch common to each. The user will then have to take the data and extrapolate what is meant by the results, as determined by the consequences of what is meant by the particular vertical and horizontal arrangement, and what conclusions have been brought forth. From that information, the user makes conclusions. He can then add information back into the web. If the program offers him the option, he can take pieces of data—'websites/journal articles' of interest to him, and put them in a storage locations that may or may not allow for more focused searching. And from the focused searching he may write papers on his conclusions, comment back onto the database, or rank data pieces of value to him. In total the users process of conducting a cross search is simply a process of the user conducting data isolation and analysis through the combination of such tools as vertical and horizontal search engines. The end result after using such tools in combination is the generation of subcategories and connections. The machine is running a data isolating tool like a vertical engine by a parsing/analyzing tool like a horizontal engine, and the resulting transformation is the data is transformed for unconnected data sets, to results inlaid with the consequences of the relationships, they were formed through like the sewing machine, common stitch example becoming known as the stitch to perform both the button hole on a Kenmore 15 machine illustrated. The steps of the process are to conduct data isolation with such as a vertical engine, and through that, to conduct categorical clustering, analysis, and association by such as a horizontal whereby results represent the combined relationship of the horizontal and the vertical together.

To aid a machine in a cross search process or from the understanding of how a machine conducts the cross search process, it will in some way isolate data into a distinct group or groups, and generate an ability to ask questions of the data, to enable a finding of characteristics of the group, question, or combination groups, questions, or both, by the scientific method. A crosshatch pattern or process of searching works because a vertical search allows you to simply chose a data pool. When a data pool can be chosen in a task separate from asking a question, it creates a hinge where a question can be asked of a group, or in other words it enables the scientific method of introducing incrementally new variables against a question to generate characters of the group or the question itself. The scientific method works by asking the same question to different things, to figure out characteristics of the things, and the question. Like for instance, asking various seeds about the need for water, allows a researcher to reach an understanding about the nature and types of the seeds and the qualities that require a need for water. When the various groups a researcher is conducting the questions on can be isolated, distinguished, and compared electronically, where a question can be asked to discreet quantities, or combinations of sets, then the scientific method of empirical observation and normal and variable qualification can be applied by a computerized method on open data sets and the whole Internet.

Taking the same example, of the Kenmore 15 sewing machine, the process the engine goes through to give the user relevant answers and results is again only combination of the two vertical and the horizontal, where the vertical is some way of separating data pools, and the horizontal is some means of going through them to show the data by the metric. In this particular example, the engine is aided in coming to a solution by enabling the horizontal metric to ask questions of both groups, seeking the commonality between them. By seeking the same question in both groups, it is able to find the single resultant that is the answer to both, representing the connection between both, without needing any source it makes this connection on to have contained the connection already made out, or to have contained both items, that the program is connecting between, though it could have.

The tool of the cross searching process will, or will be aided in, isolating all data relevant to the Kenmore 15 sewing machine, available on the web, or in a data set, and it will gather all data relevant to the a buttonhole. By allowing the option of not putting them together, but rather keeping them separate, but requiring the same answer to come from each, the researcher is able to see, where these different items are the same, in a process you have conducted himself whether or not the experiment or correlation has already been made. This allows a researcher to research by the scientific method on a broad scale, when analyzing through computerized data like a digital read out or an online journal. The cross searching process will, or will be aided in isolating and parsing to generate correlations between results.

For a programmer or creator to build the process of cross search he can program a crawler that performs a deep topical search, and a crawler that clusters through that categorically, or he can simply program that an existing horizontal engine function through a vertical engine.

The process of building a cross search involves creating an isolator and parser. For a tool to isolate and parse, or to create a data isolator and a parser a programmer could use existing vertical and horizontal technologies, or he could write a unique program that isolates based on the algorithm applied to the crawler, and parses with another algorithm. For a tool to isolate, it can be programmed to restrict by such means as using word association, by working out of a central or topical directory, by narrowing through variable features in the algorithm, or otherwise. For a tool to parse it can be programmed to parse or cluster by such mechanisms as by logic and language rules and by patterned recount. Patterned recount can function if desired by recounting words or ideas within the rest of the data, that have already been identified as relating to the metric search.

In order to host the process of a cross search a provider would allow users access to use the process of parsing within distinct data pools to generate conclusions on the results. The process of hosting a cross search involves providing the component steps necessary for the user to perform a cross search. These being, providing a means to isolate with a means that parses through it, like providing the user access to a vertical engine through which an also provided horizontal can search within to generate relational results.

This service of providing the process may be provided for free or for sale or license, and the user may be the provider himself, or another.

The best mode of the cross search process could be a series of six steps in combination. Different aspects of the invention can function together or in singularity to perform research as a novel and nonobvious research tool. The best mode of the technology works through the combination of six steps. The six steps are: the creation of the vertical search, the identification of the horizontal search, the variety of combinations that the horizontal can parse through the vertical by the scientific method, the various representation modes that illustrate different connections and results, the room of final output, and the means for bringing new information back in. Each of these steps when used in combination create the best mode of a cross search engine as a process but in isolation also function as a process that performs new types of research.

The first step is creating your vertical search profile. A vertical is a topical search: it is narrow and focused, trying to give you not the range of what might be associated with your search, but rather, the most relevant. We will be using it as the technology to choose the relevant data sets.

The second step regulates the creation and application of the metric. In order to create the idea of the variable metric, a second term needs to parse the selected pool, so the answers can be seen in terms of the metric of your choice. In this case, this metric-forming ability is created by putting a metric into the horizontal engine. Horizontals are search engines that give you the entire spectrum of answers in a pool and in their most modern form they do this in a clustering fashion.

The third step involves invoking the scientific method to dictate how to choose which items and levels to compare. The scientific method finds data on a source by adding one or more solvable variables at a time. Introducing new factors that you know the similarities and differences of is how you observe information about the source, metric, or question. Choosing fields either by their neutral-ness or similarity towards each other as per the metric, can heighten accuracy of results.

The forth steps involves choosing from the number of ways the results can be displayed that signifies different levels of underlying consequences.

The fifth step is populating and researching the room of final output. A location is available to the searcher as he is "walking" across the data. The storage location creates a place to do more focused research, stores biographical information on the document, and stores connections back outward as the user chooses items to put within it.

The last step involves putting new information back into the database and it works by the user anonymously enter data associated either with their character, cross search or general, that can be used as additional data for future searches. In addition user can rank data submitted by other users as websites according to correctness and use.

The combination of the steps two and three create the users ability to apply a variable metric, which allows, the user to ask a question of his choice. Step three allows in combination with the first two forms the user's ability to compare and step 4 and 6 create the way of ranking the results. The 6 steps in concert allow the user to apply the scientific method to the Internet, forming the solution to the problems of piecemeal research, creating more useful access to data, and a uniform process creating more accurate results.

Machine

The machine of a cross search is created by building a machine that performs some level of analysis like secondary parsing, through isolated data sets. This can be created by creating a machines including such components as a vertical search identifier or engine, that can isolate, locate, and distinguish data, and adding a second component whereby, the data is analyzed in a manner that allows for comparison by the scientific method. The two components of the machine can be created by creating a vertical and a horizontal engine that work in combination, and together the machine enables the research to research data electronically by the scientific method.

The machine can be used like a program where pressing buttons, and moving objects, and pressing on interactive objects can generate different responses within the program to enable the user to perform the cross search on the machine.

In order to create the vertical search a number of methods can be used. A vertical is a topical search. It is narrow and focused, trying to give you, not the range of what might be associated with your search but rather, the most relevant. It can be used to choose relevant data sets.

Currently vertical search engines can focus results in several ways, for example by word association, e.g. if I search 'surf board' on an engine that practices some level of word association, my results will be limited by the relationship of one word with the other. I will not see results for "gee I'm BOARD" or "SURFING the net" but for the idea that the two words, combined, impose on each other. Another way of focusing the results is to target the search engine on specific areas, as through directory centered search sites. Lexis Nexis is a law directory, PubMed medicine, Expedia travel. These can use directory specific data-bases or can include a metric to add that qualifier to the search.

Because of the nature of the cross search engine, where results from one search might be immediately used in the next round, in addition to limiting by word association, a best mode could function with a method of narrowing that could work despite a possibly more limited amount of words to associate. A level of selectivity can be created by the needs of the end user, using his research character as the data limiting starting point for what types of data should be selected.

A character centric vertical could be designated during the sign in process where the users select their characters by dictating such things as character, category of character, and experience. For example, a character could be: doctor, the category could be: ophthalmologist, and the experience could be: practicing processional, researcher, or student.

It is additionally possible that all of the 'login characters' that have already been created can wait at the side of each screen, to be selected for a particular search and that multiple data-narrowing characters could be used in combination increasing the diversity and quantity of applicable data search results.

The method behind creating a user narrowed vertical can be achieved in a number of ways, including but not limited to:
1. mapping niche engines and associating certain words to certain engine collections, and then studying each engine, to see what additional entry words give the right data
2. and/or making a metric that will include the limiting qualifiers towards the gather of results.
3. and/or storing data characteristically by the crawler An additional instrument of an amendable scroll down could be used to limit options to a more unified search, with the ability for customers to add new words to each topic not already covered, or this could be left universally open.

A vertical search can be used as a means for data collection and isolation. In the example portrayed the vertical is collecting all the variables and data on a certain type of experiment, in this case, all the variables and data from experiments conducted on drug y. The relevant results would be isolated according to the users expressed needs, and the relevant results would be chosen then by the words put into the vertical input section to narrow and select of the data.

In order to create the idea of the variable metric, a second searchable tool needs to parse the selected pool, so the answers can be seen in terms of a metric of your choice. In this case, this metric-forming ability can be created by creating a horizontal engine to go through the vertical. Horizontals are search engines that give you the entire spectrum of answers and in their most modern form they do this in a clustering fashion.

A best mode of a horizontal for a cross search could be where the horizontal clusters categorically, clustering words that would topically be defined as sub-categories of the metric within the vertical. For example, through the vertical 'coffee shops', subcategories of the parsing metric 'COFFEE' might be: Java, Sumatra, Bean, and Dark roast.

These can be found by traditional cluster functions, or more extensively, by such means as associating sub-categories of the metric through the verticals by logic and language rules and a patterned recount. Relevant logic and language rules would include the signifying words and sentence structures that connote categorical association. Patterned recount would be when words or phrases already identified through the vertical as a sub-category of the metric, are counted again through the other data sets of the vertical as something that is a subcategory, even when it does not fall within the structural signifiers of category.

A word's location in the language can identify topical subcategories by the language construction of a sentence. Using such modifiers as; include, are, and and, interpreted in the course and context of a sentence, paragraph, or piece, subcategories can be found by logic and language rules.

The patterned recount can use the result of the location count to continue the count on words and phrases that have been confirmed as sub-categories of the chosen metric.

An even more extensive clustering scheme may want to somehow include an elevated ranking system for subcategories that have risen to the level of human association and recognition by such means as through social book-marking and the reintegrated results.

A horizontal cluster function could be created by such means as logic and language tools and a patterned recount. If the vertical is all the experiments conducted on a particular drug imagine each experiment as a shape of data in the x-y plane, with data on all different types of information, then the Horizontal is the Z plane. A z-slice goes through all the experiments at the same x-y place and compares the material uniformly, asking of all the pictures of information what they have for the question. What this means in words is that an experiment might contain data on side-effects, efficacy, competing medications, nationalities, gene types and if all those are different spots on the x-y plane, the metric or the horizontal question would be a slice that measures all the experiments by the same question so all of the experiments would be ranked to show you what they say about side-effects, or nationalities, etc., holding open the other variables to be further defined by methods detailed in the next section.

How, the combination of verticals and horizontals can be used together yields the different connections by the results. The scientific method finds data on a source by adding one or more solvable variable at a time; this allows one to gain information about the data. Data fields chosen either by their neutrality or similarity towards each other as per the metric heightens the accuracy of results. Introduce as many new fields as a time, but when you search one against multiple, or multiple against multiple the set should be known by the thing in common that is propagating the search. Such class creation can be created by running multiples layers of the cross search. Such that, the answers of a previous question can be used in combination as the data pool for the next question, and in their connection to the previous question the set, is like a class. This is one way to gain more information on the pools of data with the cross search.

There are myriad combinations of how the vertical and horizontals can be used in combination. The various combinations produce different relationships for the results, and let you find underlying reasons between them. One way of utilizing a cross search—scientifically—would be to conduct one search, in a way where you could compare it with another one variable off. Another efficient way to gain information from a cross search would be to form a program that optimized the combination of results, added or subtracted results from each other to form groups and seek differences, and measure which results are common between groups, to find connecting links.

The cross search works towards these detailed aims through the diversity of the application of the two search varieties in combination, including the ability to use results in subsequent searches in part or in whole, to create different levels of understanding.

The horizontal and vertical can work together to generate different inferences of results.

The vertical expansion is a function that works to expand the relevant topic to include the things that would be relevant but might not be triggered by the same initial search word.

To create it, when the vertical is put with the horizontal, other words that would serve as identifying substitutes of the vertical or substitutes of the particular combination of verticals either brought up by the combination of the verticals or brought up by the relationship between the horizontal question and the verticals, can serve as further focused search topics as well. For example, when cross searching a particular chemical bond and a particular active ingredient by side effects the vertical expansion would expand to include data from drug names the merely meet those three results, whether in every data sheet, the active ingredients and bonding are mentioned.

This can be used work best a function that can be scaled off and on across a range, to include more or fewer more focused results.

The next integral component to a best-mode, educes the data from the scientific method by ranking and displaying the final results in various transformative, and illustrative ways.

The first of which would be the word equations. Word equations would be displayed in two ways. They can be displayed initially by a stratification of the words and word associations, connecting purpose and utility in such a way that two separate results might converge down the road into one by a common correlation. For example, sub-categorical results of milk and cream can converge to a common purpose of something like 'thickening' when the most frequent usage of the word through the data sets are inspected.

This can be calculated by repeating the percentage similar of 'would be' results of the metric back through the fields of data, as if they themselves are a metric searching for the most fundamental form of the answer's particular sub-category. It could look and be displayed like a horizontal family tree where it might get smaller and more dense until the branches from two completely separate topics may come together and show why they both showed up as the answer.

The other threshold illustrative way of the best mode is and graphically through density and time. Accordingly the following subcategories will be ranked by their percentage the amount to of the total cited occurrences of the categories, and they can be displayed concentrically in correlation with their percentage and then each individual packet of results would branch then backwards in terms of time, that the result was made.

Displayed by groups of items that would be considered similar or same, ranked by percentage of total occurrence in a radial density map, and splaying out when brushed over, in terms of time, particular documents containing multiple ideas would connect the pools together. The connection lines can be made always available, but then it can be that though displaying the time-line a user would be able to see exactly where the related documents connect.

It can also be made that the connecting line could be clickable to move across, and that the user could choose topic categories to move through the data in time.

One possible formulation of how the information could be displayed includes by density of same/similar result, and across time.

Other important and possible representation techniques include and ability to show the results as optimized as per the metric, when various thing verticals or answer choices are used in combination. The ability to re-rank results as per a different metric, the ability to use a result against the data set again to receive a more exact measure and the ability to use results in several layers of further study. All of these are possible through display and utilization principals of the vertical and horizontal.

The diversity of representation methods that can happen in layer two can include optimization and re-ranking and scaling out across variables.

A display possibility for optimization, can be where the subcategories can be used to re-rank the vertical's being optimized by various topics.

Additional layers and levels of research would be possible. In each layer the diversity of how the results can be used together expands, as illustrated in the figure below.

Additional features that would make a best mode better include the room of final output and a means of storing data and data about data in a more exclusive use format. Step five is called the Backpack. Every character—that could have been created in step one can have a real or virtual "backpack" that will become the room of final output. The backpack is a storage location that creates a place to do more focused research, stores biographical information on the document, and locates connections back outward.

The character and backpack can be made to "walk" through the data, in time, or across the connections, putting all or relevant documents in their backpack. At a later time, cross search can happen, only between the documents in the back-pack, if desired. Copyright information for the data will be ready, and connections from the document back to the internet can be made at that time (e.g. for links, transactions, postings, and submissions).

There is one other feature the backpack can have, the (C) (X) (G) buttons, that are available on every page, but most relevant perhaps, in conclusion.

Step Six: Beta 2.0> Categorically getting more information in.

Reincorporation:

(C) character associated
(X) cross search association
(G) generic examples of technologies this will bring together are:
SideWiki/layers (annotation engine)
Tin Eye/google goggles (reverse image search)
and Mobot (camera phone reverse image search)
and: Yelp (example of psychologically motivated data input)

In order to presenting, share, or host the machine a provider can make the machine accessible to the user population is some way as by hosting it as a program on the internet, or by hosting a location where they can download or buy the program. To present, share or host the machine, a provider may The best mode of the machine is created through the six component technology units behind the cross search as a process. The six components are a vertical search engine, a horizontal search engine, a variety of combinations of the horizontal through vertical, the display, the storage, and the layered recording in.

Different aspects of the invention can function together or in singularity as a machine to perform research as a novel and nonobvious research tool. The best mode of the machine works through the combination of six components. The machine would function like a program where the user walks inside a three-d room, conducts search equations on a chalk board, chooses vertical characters to help narrow his search, and stores information in a backpack. The information would be viewable in several modes including, by density and time, including optimization, scaling for, and reranked, and the user would be allowed to comment into the collection of data, to add to the data for future searches. This would be the users experience of a best mode of the cross search machine. The best mode of building it would be to program a vertical and a horizontal that could run through each other, in addition to programming the tool to be received in a visually accessible mode like the room just described. The best mode of hosting the machine, would be to host on the basis of annual licenses, providing two levels of service, a basic that uses the machine through free data like the internet, and a professional version that allows the researcher to use the machine on his own data, and through private data sets like pay for use journals and database sites like lexis nexis and capital iq.

Manufacture

The manufacture includes the packaging of the software, and running processing that allow the program to be purchased like a single component textile, as when the program is encompassed on a compact disk, or when the program is put in a consolidated for to be downloaded from the internet.

To make the program on a disk or downloadable site, the code can be transferred to a storage device. To run it make involve using the computers ram or hard drive, as well as virtual storage space and processing room on a cloud.

It would be used simple by inserting the cd, downloading the program, or having access to the cloud and then running the program.

The stored code works by being read as instructions to a computer and generating the program.

Hosting or providing the stored code could involve hosting a website where the code could be downloaded, or manufacturing cd-roms or other storage devices, where the code is then transferred on to and shipped out.

The program can be manufactured in a couple of ways. The two that would make up the best mode would be the downloadable storage of the software as a program on the Internet, and the second would be the containment of the software of a compact disk or some other remote form of container that can be transported to the user by some means other that Internet.

New Use

New use's of this machine and process include but are not limited to professional research for such communities as physicians, insurance companies, pharmaceutical companies, investment bankers, consultants, stoke brokers, engineers, physicists, chemists, computer researchers, lawyers and legal scholars, astronauts, product designers, market researchers, banks, linguists, historians, literature studiers, and as a recreational search tool for shoppers, athletes, and everyone.

Examples of the variety of ways the search can be conducted to answer different questions relationally are illustrated in the drawing with comments attached.

The invention claimed is:

1. A method for use in a data isolating research tool, said data isolating research tool comprising a horizontal search engine, said method comprising:
   (1) searching, by the horizontal search engine, horizontally using a first search term to divide a first data pool into first clusters corresponding to a first set of subcategories associated with said first search term; and
   (2) searching, by the horizontal search engine, horizontally using a second search term corresponding to the first search term to divide a second data pool into second clusters corresponding to a second set of subcategories associated with the second search term;
   (3) subtracting, by the data isolating research tool, cluster(s) in the first clusters and in the second clusters corresponding to subcategory(-ies) common to the first set of subcategories and the second set of subcategories such that cluster(s) corresponding to different subcategories remain for the first clusters and cluster(s) corresponding to different subcategories remain for the second clusters;
   wherein the first search term and the second search term are metrics that the first data pool and second data pool are compared under and allow demonstration of differences and connections of the first data pool and the second data pool;
   (4) generating a third data pool comprising some of the remaining first cluster(s);
   (5) generating a fourth data pool comprising some of the remaining second cluster(s) or one or more other cluster(s); and
   (6) searching the third data pool, by the horizontal search engine, horizontally the third data pool using a third search term, and searching the fourth data pool, by the horizontal search engine, horizontally using a fourth search term, to provide a comparison of the third data pool and the fourth data pool;
   wherein the third search term and the fourth search term are metrics that the third data pool and fourth data pool are compared under and allow demonstration of differences and connections of the third data pool and the fourth data pool.

2. The method according to claim 1, further comprising:
providing a comparison of the respective clusters of the first data pool and the second data pool, wherein:
the first data pool comprises control data; and
the second data pool comprises variable data.

3. The method according to claim 1, wherein:
the horizontal search engine is configured to determine said first set of subcategories associated with the first search term by selecting words in the same sentence as the second search term.

4. The method according to claim 1, wherein:
the horizontal search engine is configured to determine said first set of subcategories associated with the first search term by selecting words, topics, or phrases through logic and language rules signifying that the words, topics, or phrases represent subcategories of the first search term.

5. The method according to claim 1, wherein the first set of subcategories associated the first search term are determined by a spinor matrix programming, manually through social bookmarking, or a clustering function.

6. The method according to claim 1, further comprising:
ranking the first clusters corresponding to the first set of subcategories; and
generating the selected clusters further based on the ranking of the first clusters.

7. The method according to claim 1, further comprising:
ranking the first clusters corresponding to the first set of subcategories of the horizontal search engine by frequency of occurrence of the respective subcategory through the first data pool; and
displaying the first clusters corresponding to the first set of subcategories according to the ranking.

8. The method according to claim 1, wherein searching horizontally further comprises pattern recount, wherein pattern recount comprises:
determining a word or subcategory or idea tagged relevant to the first search term through logic and language rules, recounting or reclustering the second data pool using the word or subcategory or idea, even though the word or subcategory or idea was not in the second set of subcategories or that the word or subcategory or idea was not identifiable when the horizontal search engine searched the second data pool using the second search term.

9. The method according to claim 1, further comprising:
selecting, by the data isolation research tool, a combination of the first clusters corresponding to the first set of subcategories from the horizontal search engine for further searching vertically and/or horizontally, wherein the combination is selected from the first clusters to optimize a particular metric being applied to the combination in said further searching.

10. The method according to claim 1, further comprising:
subtracting out or maintaining clusters generated by the horizontal search engine for different data pools to show unique differences.

11. The method according to claim 1, further comprising:
generating respective data pools for each requirement of a class, wherein the class has members and the members of the class all meet the requirements of the class;

generating the members of the class by finding subcategories which are common to respective subcategories generated from the respective data pools; and generating a third data pool using the members of the class.

12. The method according to claim 11, further comprising:
applying, by the horizontal search engine, a third search term to the third data pool to seek commonalities and/or differences between the third data pool and a fourth data pool.

13. The method according to claim 12, further comprising:
ranking the clusters of subcategories by a metric different from the first and second search term.

14. The method according to claim 1, further comprising:
displaying the first clusters corresponding to the first set of the subcategories using word equations by a stratification of words and word associations between the first set of subcategories.

15. The method according to claim 1, further comprising:
ranking the first clusters corresponding to the first set of the subcategories by the cluster's amount of the total cited occurrences of the respective subcategory.

16. The method according to claim 1, further comprising:
displaying the first clusters in groups of clusters that are considered similar.

17. The method according to claim 1, further comprising;
ranking the first clusters corresponding to the first set of subcategories by percentage of total occurrence of the respective subcategories; and displaying the first clusters according to the ranking in a radial density map.

18. A non-transitory computer readable storage medium comprising instructions or code that when executed on a processor configures the processor to perform one or more operations for providing a data isolating research tool having a horizontal search engine, the operations comprising:
   (1) searching, by the horizontal search engine, horizontally using a first search term to divide a first data pool into first clusters corresponding to a first set of subcategories associated with said first search term; and
   (2) searching, by the horizontal search engine, horizontally using a second search term corresponding to the first search term to divide a second data pool into second clusters corresponding to a second set of subcategories associated with the second search term;
   (3) subtracting, by the data isolating research tool, cluster(s) in the first clusters and in the second clusters corresponding to subcategory(-ies) common to the first set of subcategories and the second set of subcategories such that cluster(s) corresponding to different subcategories remain for the first clusters and cluster(s) corresponding to different subcategories remain for the second clusters;
   wherein the first search term and the second search term are metrics that the first data pool and second data pool are compared under and allow demonstration of differences and connections of the first data pool and the second data pool;
   (4) generating a third data pool comprising some of the remaining first cluster(s);
   (5) generating a fourth data pool comprising some of the remaining second cluster(s) or one or more other cluster(s); and
   (6) searching the third data pool, by the horizontal search engine, horizontally the third data pool using a third search term, and searching the fourth data pool, by the horizontal search engine, horizontally using a fourth search term, to provide a comparison of the third data pool and the fourth data pool;
   wherein the third search term and the fourth search term are metrics that the third data pool and fourth data pool are compared under and allow demonstration of differences and connections of the third data pool and the fourth data pool.

19. An apparatus for isolating data comprising:
a memory element operable to store electronic code; and
a processor operable to execute instructions associated with the electronic code, such that the apparatus is configured to:
   (1) search, using a horizontal search engine, horizontally using a first search term to divide a first data pool into first clusters corresponding to a first set of subcategories associated with said first search term; and
   (2) search, using the horizontal search engine, horizontally using a second search term corresponding to the first search term to divide a second data pool into second clusters corresponding to a second set of subcategories associated with the second search term;
   (3) subtract using a data isolating research tool, cluster(s) in the first clusters and in the second clusters corresponding to subcategory(-ies) common to the first set of subcategories and the second set of subcategories such that cluster(s) corresponding to different subcategories remain for the first clusters and cluster(s) corresponding to different subcategories remain for the second clusters;
   wherein the first search term and the second search term are metrics that the first data pool and second data pool are compared under and allow demonstration of differences and connections of the first data pool and the second data pool;
   (4) generate a third data pool comprising some of the remaining first cluster(s);
   (5) generate a fourth data pool comprising some of the remaining second cluster(s) or one or more other cluster(s); and
   (6) search the third data pool, using the horizontal search engine, horizontally the third data pool using a third search term, and searching the fourth data pool, by the horizontal search engine, horizontally using a fourth search term, to provide a comparison of the third data pool and the fourth data pool;
   wherein the third search term and the fourth search term are metrics that the third data pool and fourth data pool are compared under and allow demonstration of differences and connections of the third data pool and the fourth data pool.

20. The apparatus of claim 19, wherein the apparatus is further configured to:
select, using the data isolation research tool, a combination of the first clusters corresponding to the first set of subcategories from the horizontal search engine for further searching vertically and/or horizontally, wherein the combination is selected from the first clusters to optimize a particular metric being applied to the combination in said further searching.

* * * * *